(12) United States Patent
Weber et al.

(10) Patent No.: US 10,423,747 B2
(45) Date of Patent: Sep. 24, 2019

(54) METHOD AND APPARATUS FOR SUPPORTING TEMPORAL VIRTUALIZATION ON A TARGET DEVICE

(71) Applicant: Intel Corporation, Santa Clara, CA (US)

(72) Inventors: Scott J. Weber, Piedmont, CA (US); Carl Ebeling, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 15/422,834

(22) Filed: Feb. 2, 2017

(65) Prior Publication Data

US 2018/0218103 A1 Aug. 2, 2018

(51) Int. Cl.
*G06F 17/50* (2006.01)

(52) U.S. Cl.
CPC ........ *G06F 17/5054* (2013.01); *G06F 17/505* (2013.01); *G06F 17/5072* (2013.01); *G06F 17/5077* (2013.01); *G06F 2217/78* (2013.01); *G06F 2217/84* (2013.01)

(58) Field of Classification Search
CPC ............... G06F 17/505; G06F 17/5045; G06F 17/5054; G06F 21/76; G06F 9/3851; G06F 11/3688

USPC .................................................. 716/104, 138
See application file for complete search history.

(56) References Cited

U.S. PATENT DOCUMENTS

| | | | | |
|---|---|---|---|---|
| 2007/0273698 | A1* | 11/2007 | Du ....................... | G06F 9/30167 345/501 |
| 2010/0125722 | A1* | 5/2010 | Hickey ................. | G06F 9/3851 712/228 |
| 2018/0113797 | A1* | 4/2018 | Breslow .............. | G06F 11/3688 |

OTHER PUBLICATIONS

Leiserson, et al.; "Retiming Synchronous Circuitry", Algorithmica (1991) 6: 5-35.
Tullsen, et al.; "Simultaneous Multithreading: Maximizing On-Chip Parallelism"; 22nd Annual International Symposium on Computer Architecture, Santa Margherita Ligure, Italy, Jun. 1995.
Marr, et al.; "Hyper-Threading Technology Architecture and Microarchitecture"; Intel Technology Journal Q1, 2002.

* cited by examiner

*Primary Examiner* — Paul Dinh

(57) ABSTRACT

A method for designing a system on a target device includes modifying a circuit to enable the circuit to support a plurality of threads at an instant of time. An interface is generated that enables one or more of the plurality of threads to be swapped out of an execution queue for accessing the circuit and that enables one or more other threads to be swapped into the execution queue for accessing the circuit, wherein at least one of the modifying and the generating is performed by a processor.

18 Claims, 43 Drawing Sheets

Inputs from Client 4. Executing Client 4, Client 1. Client 1 state is cleared by injecting a clear state for the empty slot 1. Client 2 is swapped into the empty slot 3. Outputs from Client 2. Swap out Client 4.

METHOD AND APPARATUS FOR SUPPORTING TEMPORAL VIRTUALIZATION ON A TARGET DEVICE

FIELD

Embodiments of the present disclosure relate to tools for designing systems on target devices. More specifically, embodiments of the present disclosure relate to a method and apparatus for supporting temporal virtualization on a target device.

BACKGROUND

Target devices such as field programmable gate arrays (FPGAs), application specific integrated circuits (ASICs), and structured ASICs are used to implement large systems that may include millions of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are high-level compilation and hardware description language (HDL) compilation. High-level compilation (or "high-level synthesis") involves generating an HDL of a system from a computer language description of the system. HDL compilation involves performing synthesis, placement, routing, and timing analysis of the system on the target device.

When developing circuits on a spatial architecture, the circuits can be implemented as spatially distinct. This is necessary when the circuits perform different functions. When the circuits implement the same function, it may not be necessary to spatially replicate the implementation. In the realm of virtualization, where multiple clients may wish to access the same hardware resource, another option is to implement a single circuit and share it among the clients. In both scenarios, trust and isolation between individual clients are important considerations.

SUMMARY

According to embodiments of the present disclosure, methods and apparatus for supporting temporal virtualization on a target device are disclosed. Embodiments of the present disclosure transform a circuit to enable it to run multiple threads. The transformation involves adding components to support increasing a number of states used by the circuit, and adding components to input, observe, output, and swap threads. According to an embodiment of the present disclosure, the transformed circuit allows a number of threads running on the circuit to change to match demands of a system. Threads may be swapped-in and swapped-out in order for different threads to utilize resources of the circuit at different times. The transformed circuit provides safeguards that allow a plurality of threads to utilize its resources while securing its data.

According to an embodiment of the present disclosure, a method for designing a system includes modifying a circuit to enable the circuit to support a plurality of threads at an instant of time. An interface is generated that enables one or more of the plurality of threads to be swapped out of an execution queue for accessing the circuit and that enables one or more other threads to be swapped into the execution queue for accessing the circuit. According to an aspect of the present disclosure, the interface prevents data associated with the thread that is swapped out to be utilized by another thread.

According to an embodiment of the present disclosure, a method for designing a system on a target device includes identifying a circuit to be implemented on the target device that supports execution of a single thread at an instant of time. A number of threads desired to be supported by the circuit at the instant of time is identified. The circuit is modified to allow the circuit to support the number of threads. An interface is generated, between the circuit and one or more clients executing the plurality of threads, that manages data transmitted between the one or more clients and the circuit. According to an aspect of the present disclosure, the interface prevents data associated with the thread that is swapped out to be utilized by another thread.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
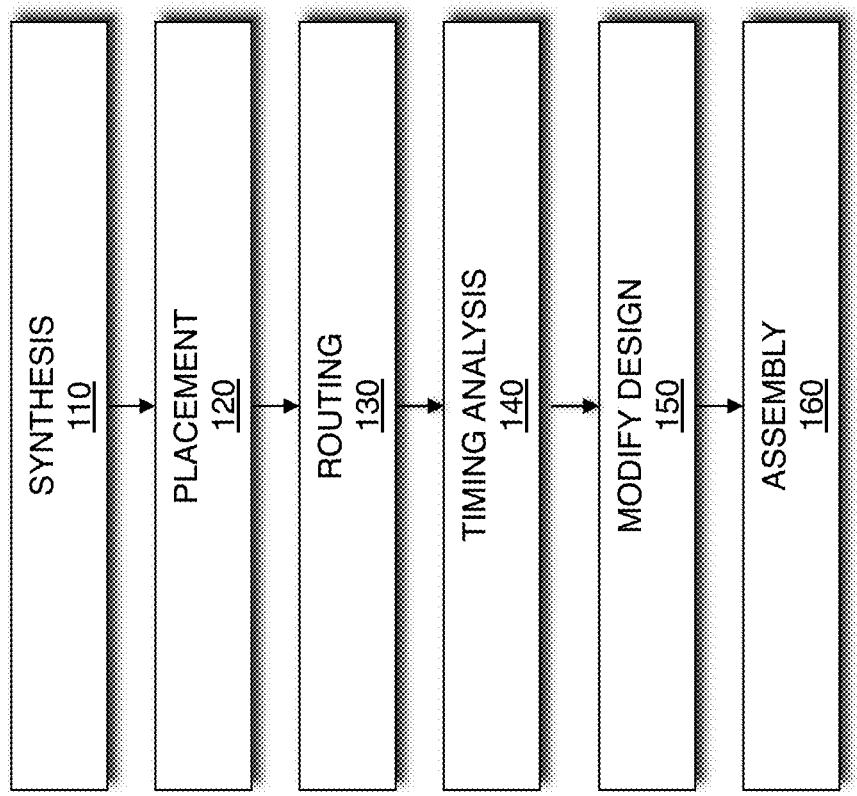
FIG. 1 is a flow chart illustrating a method for designing a system on a target device according to an exemplary embodiment of the present disclosure.

FIG. 1 is a flow chart illustrating a method for designing a system on a target device according to an exemplary embodiment of the present disclosure. The target device may be a field programmable gate array (FPGA), application specific integrated circuit (ASIC), a structured ASIC, or other device whose functionality is described by a hardware description language (HDL). According to one embodiment, the procedure illustrated in FIG. 1 may be performed by one or more computer aided design (CAD)/electronic design automation (EDA) tools implemented on a computer system.

At 110, the system is synthesized. Synthesis includes generating a logic design of the system to be implemented by the target device. According to an embodiment of the present disclosure, synthesis generates an optimized logical representation of the system from an HDL design definition. Synthesis also includes mapping the optimized logic design. Mapping includes determining how to implement logic gates and logic elements in the optimized logic representation with specific resources on the target device. According to an embodiment of the present disclosure, a netlist is generated from mapping. This netlist may be an optimized technology-mapped netlist generated from the HDL.

According to an embodiment of the present disclosure, one or more circuits in the logic design are transformed during synthesis to enable temporal virtualization. The circuits may be, for example, accelerators or other circuitry that may be accessed or used by a plurality of components or applications. Each of the components or applications may be referred to as a thread which is executed by a client, where a client may execute one or more threads. By enabling temporal virtualization of a circuit, the circuit may be time-division multiplexed. According to an embodiment of the present disclosure, the circuit is transformed to support C contexts by duplicating a state element C times without changing its combinatorial circuit. Supporting machinery is also generated to provide appropriate mechanisms to allow the sharing of the combinational circuit secure which provides an alternative to having spatially distinct copies to provide isolation.

At 120, the system is placed. According to an embodiment of the present disclosure, placement involves placing the mapped logical system design on the target device. Placement works on the technology-mapped netlist to produce a placement for each of the functional blocks. According to an embodiment of the present disclosure, placement includes fitting the system on the target device by determining which resources on the logic device are to be used for specific logic elements, and other function blocks, determined to implement the system during synthesis. Placement may include clustering which involves grouping logic elements together to form the logic clusters present on the target device. According to an embodiment of the present disclosure, clustering is performed at an early stage of placement and occurs directly after synthesis during the placement preparation stage.

At 130, the placed design is routed. During routing, routing resources on the target device are allocated to provide interconnections between logic gates, logic elements, and other components on the target device. Routability optimization may also be performed on the placed logic design. According to an embodiment of the present disclosure, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 140, timing analysis is performed on the system designed by procedures 610, 620, and 630. According to an embodiment of the present disclosure, the timing analysis determines whether timing constraints of the system are satisfied. As part of timing analysis, slack analysis may be performed.

At 150, the design for the system is modified in response to the timing analysis. According to an embodiment of the present disclosure, the design for the system may be modified in response to determining that timing constraints have not been satisfied. The design for the system may be modified by a designer manually or alternatively the design may be modified automatically by the EDA tool by re-executing one or more of procedures 110, 120, and 130. It should also be appreciated that each procedure may perform this optimization in its first invocation by performing the analysis during its execution. Timing analysis 140 may be performed after the system is modified to collect statistics of the modified design of the system.

At 160, an assembly procedure is performed. The assembly procedure involves creating a program file that includes information determined by the procedures described at 110, 120, 130, 140, and 150. The program file may be a bit stream that may be used to program a target device. According to an embodiment of the present disclosure, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2:
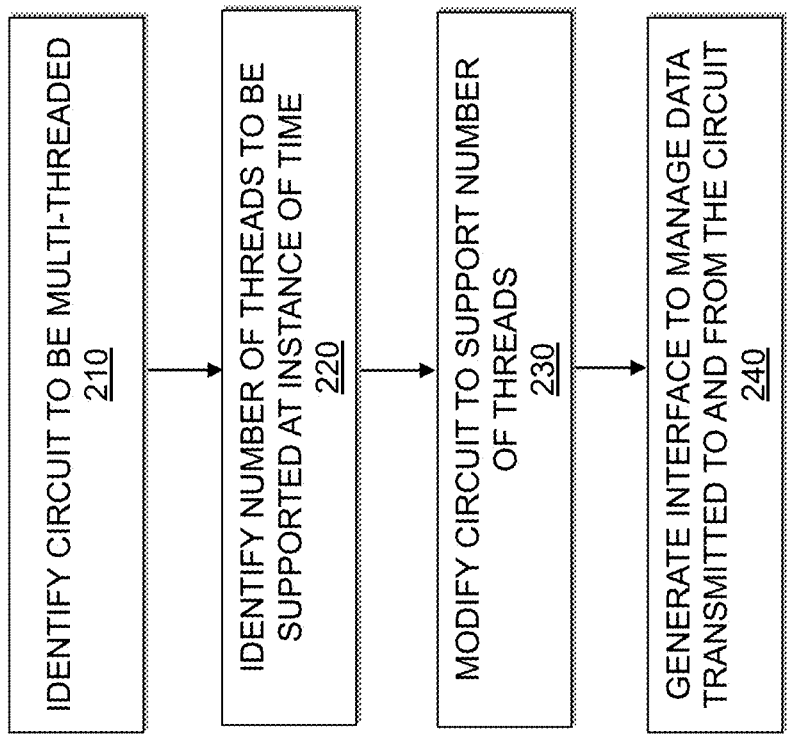
FIG. 2 is a flow chart illustrating a method for transforming a circuit to support temporal virtualization according to an exemplary embodiment of the present disclosure.

FIG. 2 is a flow chart illustrating a method for transforming a circuit to support temporal virtualization according to an exemplary embodiment of the present disclosure. According to an embodiment of the present disclosure, the procedures illustrated in FIG. 2 may be performed during synthesis 110 (shown in FIG. 1), high level synthesis performed prior to hardware description language compilation, or a different procedure. At 210, a circuit is identified to be transformed to enable it to be multi-threaded. The circuit may initially be capable of supporting only a single thread at an instant of time. According to an embodiment of the present disclosure, the circuit may be identified in response to receiving input provided by a designer that identifies the circuit. According to an alternate embodiment of the present disclosure, the circuit may be identified by evaluating a high-level design of a system independent from any input provided by a designer to identify the circuit. The circuit may be identified by evaluating its characteristics and resources required for implementation as well as a number of threads that may accesses it.

At 220, a number of threads to be supported by the circuit at an instant of time is identified. According to an embodiment of the present disclosure, the number of threads to be supported by the circuit may be identified in response to receiving input provided by a designer. According to an alternate embodiment of the present disclosure, the number of threads to be supported by the circuit may be identified by evaluating a high-level design of the system independent from utilizing any input provided by a designer to identify the number of threads. The number of threads to be supported by the circuit an instant of time may be determined by identifying a number of threads desired given an ideal or optimal use of the circuit. For example, the granularity of interleaving threads for a circuit may be limited by the mix of feedback path cycle lengths of the circuit. The number of threads allowed may be limited by a greatest common divisor (GCD) of the feedback cycle lengths since feedback states have to be sent to the same thread for all feedback paths.

At 230, the circuit is modified to support the number of threads. According to an embodiment of the present disclosure where a number of threads to be supported is C, the circuit is modified by adding C-1 registers before all registers that are involved in a feedback path or in a reconvergent fanout. After adding the C-1 registers to the circuit, the circuit may further be register retimed to reduce latency.

At 240, an interface is generated to manage data that is transmitted to and from the circuit from one or more clients executing one or more threads accessing the circuit. According to an embodiment of the present disclosure, the interface includes circuitry that enables one or more threads to be swapped out of an execution queue for accessing the circuit and that enables one or more threads to be swapped into the execution queue for accessing the circuit. In this embodiment, data associated with the one or more threads to be swapped out of the execution queue are swapped out of the circuit, and data associated with the one or more threads that are swapped into the execution queue are swapped into the circuit. A thread scheduler that operates as the controller for the execution of threads and that manages the interfaces may also be generated at 240.

Figure 3:
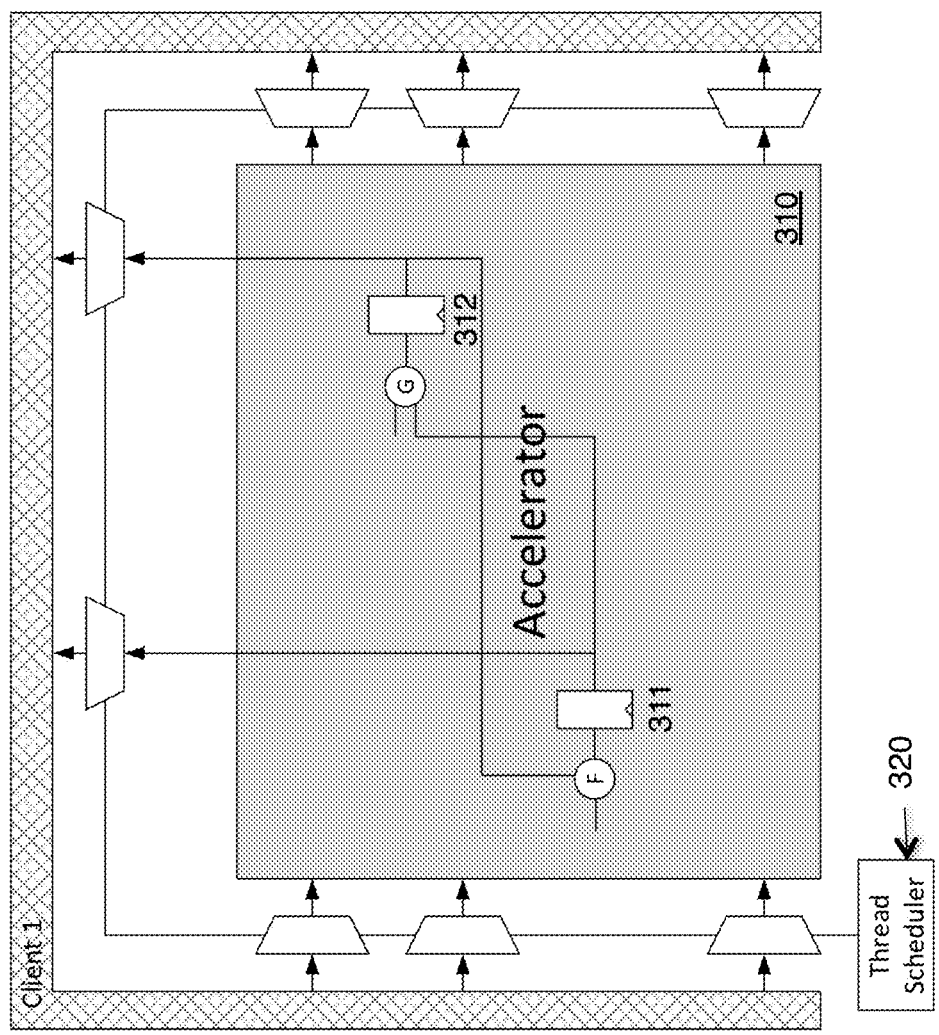
FIG. 3 illustrates a circuit that supports a single thread of execution according to an exemplary embodiment of the present disclosure.

FIG. 3 illustrates a circuit 310 that supports a single thread of execution according to an exemplary embodiment of the present disclosure. The single thread may be executed by client 1. In one embodiment, the circuit 310 operates as an accelerator that may be used to perform one or more functions in place of software running on a general purpose processor. The exemplary circuit 310 includes a combinational circuit F and a combinational circuit G. The circuit 310 includes a register 311 that registers outputs of combinational circuit F, and a register 312 that registers outputs of combinational circuit G. Registers 311 and 312 are in a feedback path. The combinational circuit F receives an input from a thread, and the combinational circuit G receives a first input from a register 311 and a second input from the thread.

The circuit 310 is wrapped with a client interface that directs inputs into the circuit 310, allows for the observation of states of the circuit 310, and directs outputs from the circuit 310. The interface also includes a thread scheduler 320 that controls the selection of inputs into the circuit 310, controls the selection of output of states from the circuit 310, and controls the selection of destination of outputs from the circuit 310. It should be appreciated that when the circuit 310 supports a single thread, the thread scheduler 320, multiplexers, and demultiplexers may be removed. If the circuit 310 is transformed to support a plurality of threads, then the thread scheduler 320, multiplexers, and demultiplexers are used to differentiate the threads.

Figure 4A:
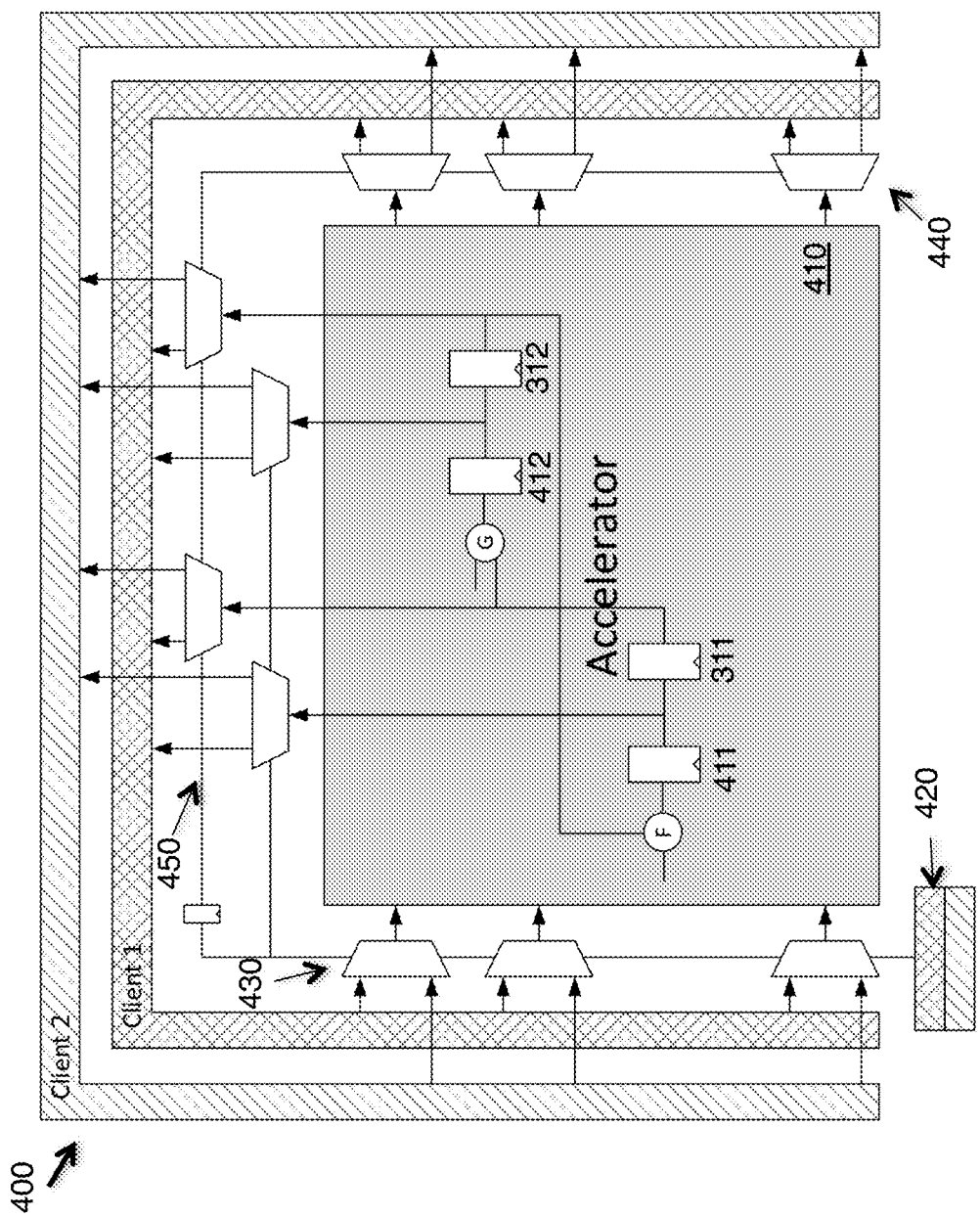
FIG. 4A-O illustrate a transformed circuit and interface that support a plurality of threads of execution and examples of execution sequences of the transformed circuit according to an embodiment of the present disclosure.

FIG. 4A illustrates a temporal virtualization accelerator machinery 400 that includes a circuit 410 and interface that supports two threads of execution at an instant of time according to an embodiment of the present disclosure. Utilizing a transformation technique referred to as C-slow retiming transformation, transformed circuit 410 adds registers 411 and 412. Registers 411 and 412 represent the C-1 registers added before registers that are involved in a feedback path or in a reconvergent fanout, where C is a number of threads supported by the circuit 410. The registers 411 and 412 add replicated states for the circuit 410.

According to an embodiment of the present disclosure, the interface to circuit 410 is also transformed. Input multiplexers 430 have C inputs. Output de-multiplexers 440 have C outputs which are controlled by an appropriately delayed thread identifier. The thread identifier is delayed by C-1 cycles to correctly handle the C-slow retiming of the circuit 410. The observing interface requires adding de-multiplexers 450 for the newly replicated states. Thread scheduler 420 operates to generate control signals to control selectors 430, 440, and 450.

Figure 4B:
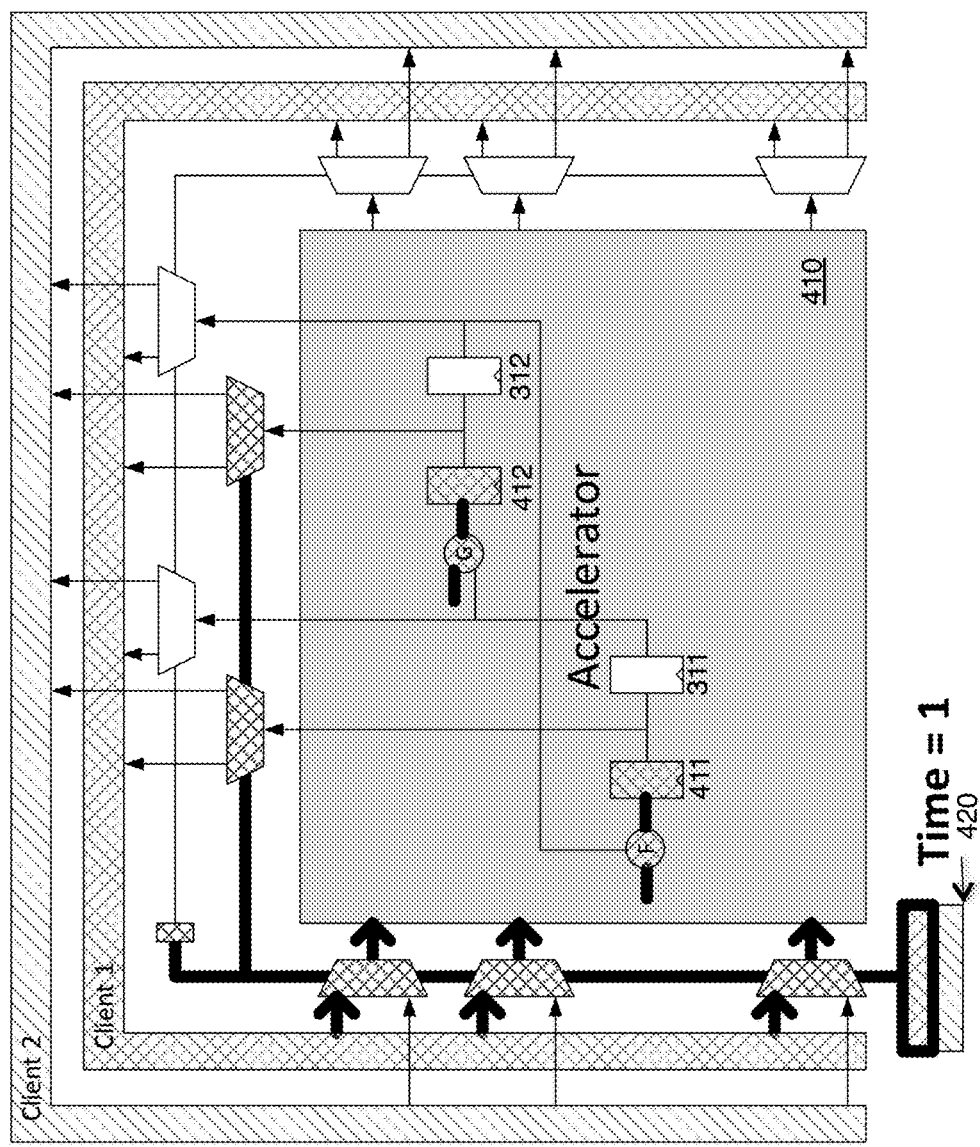
Figure 4C:
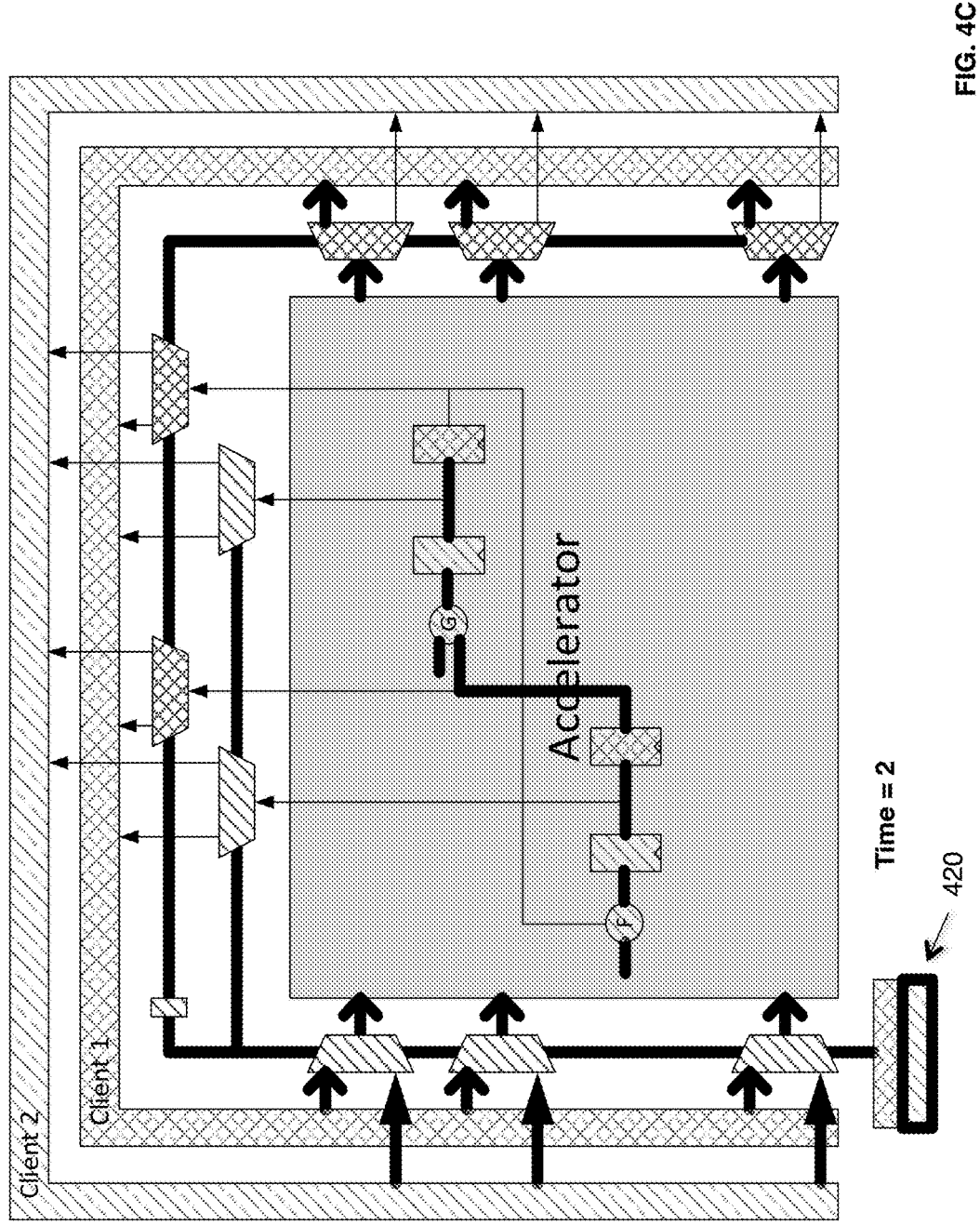
Figure 4D:
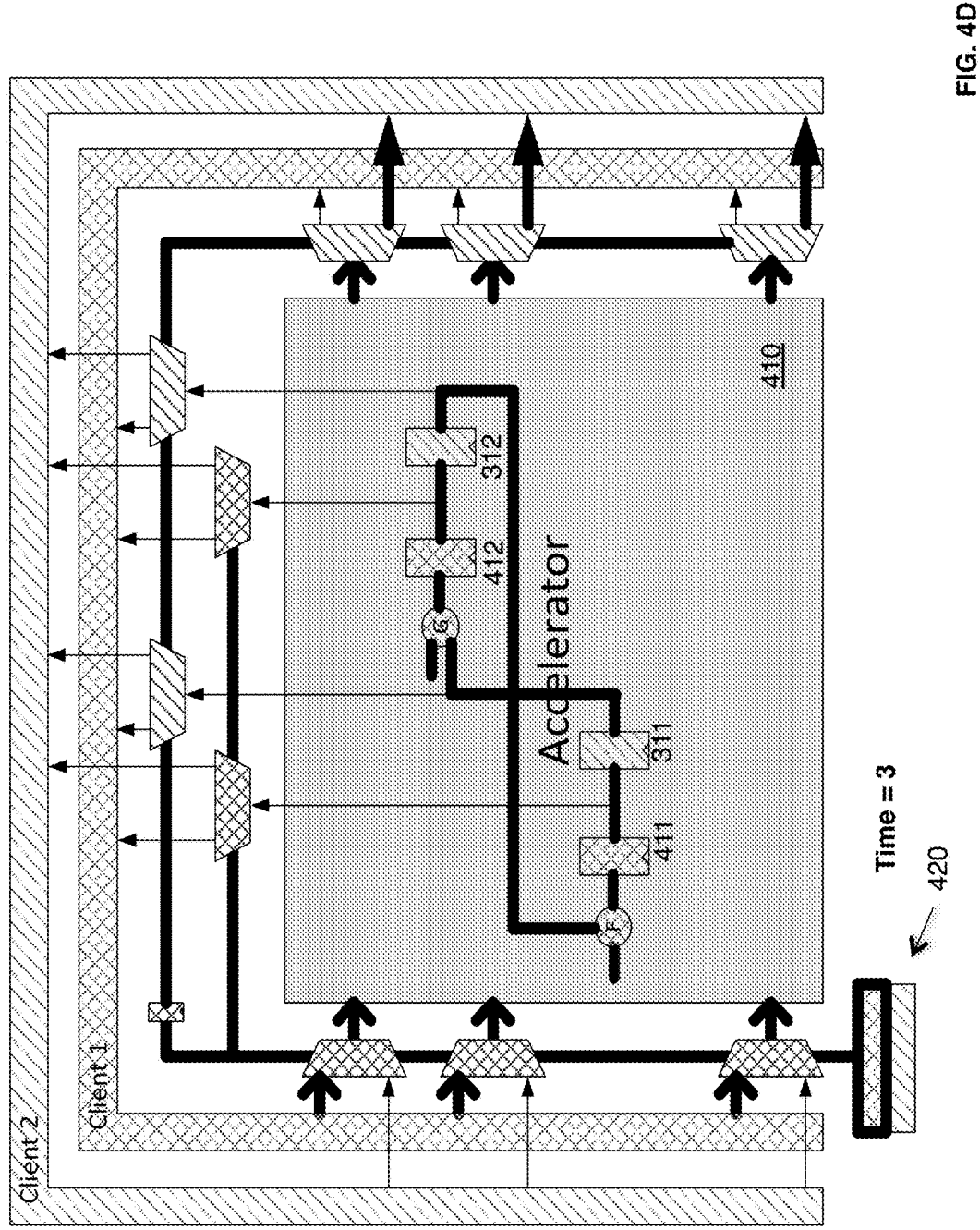
Figure 4E:
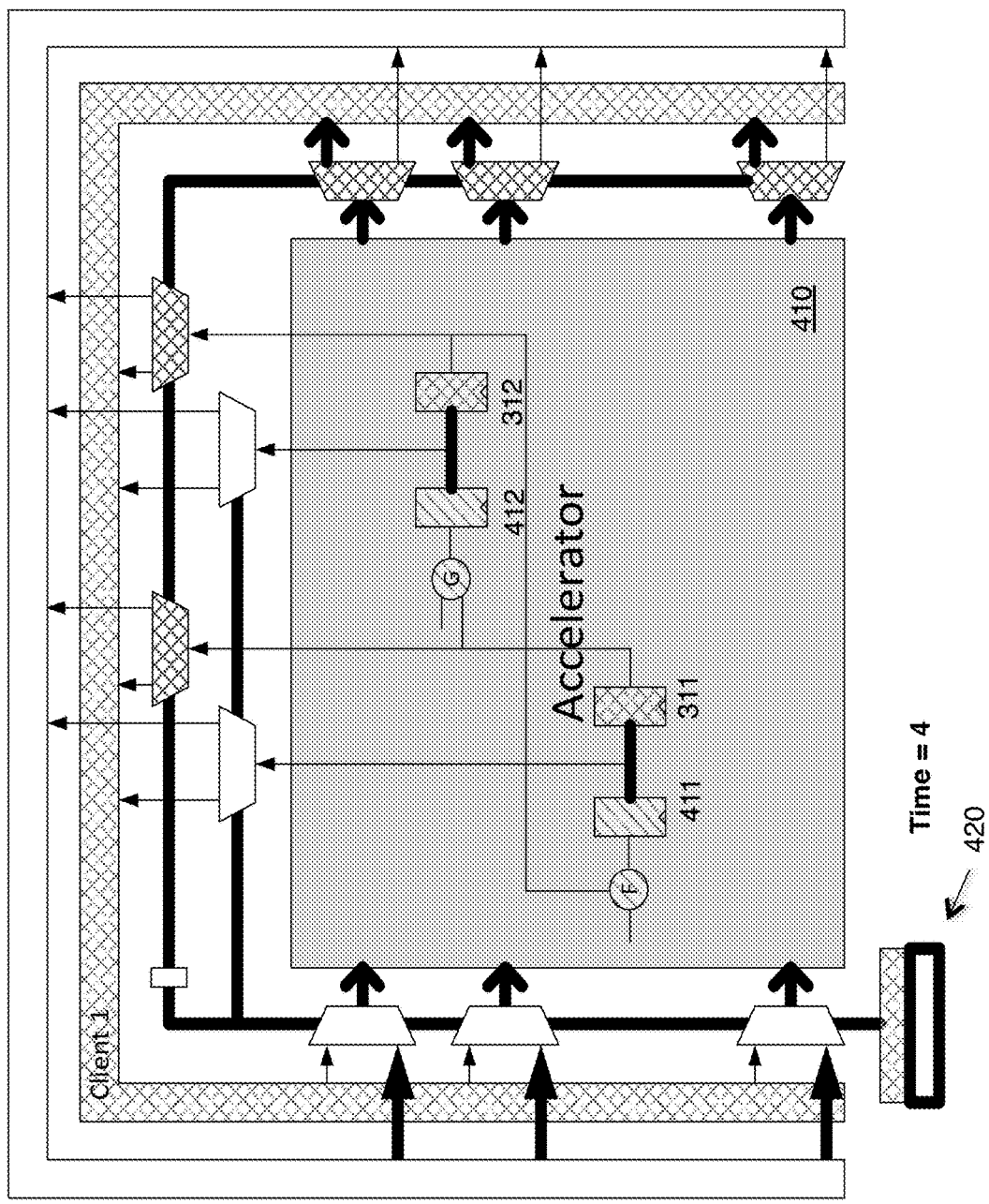
Figure 4F:
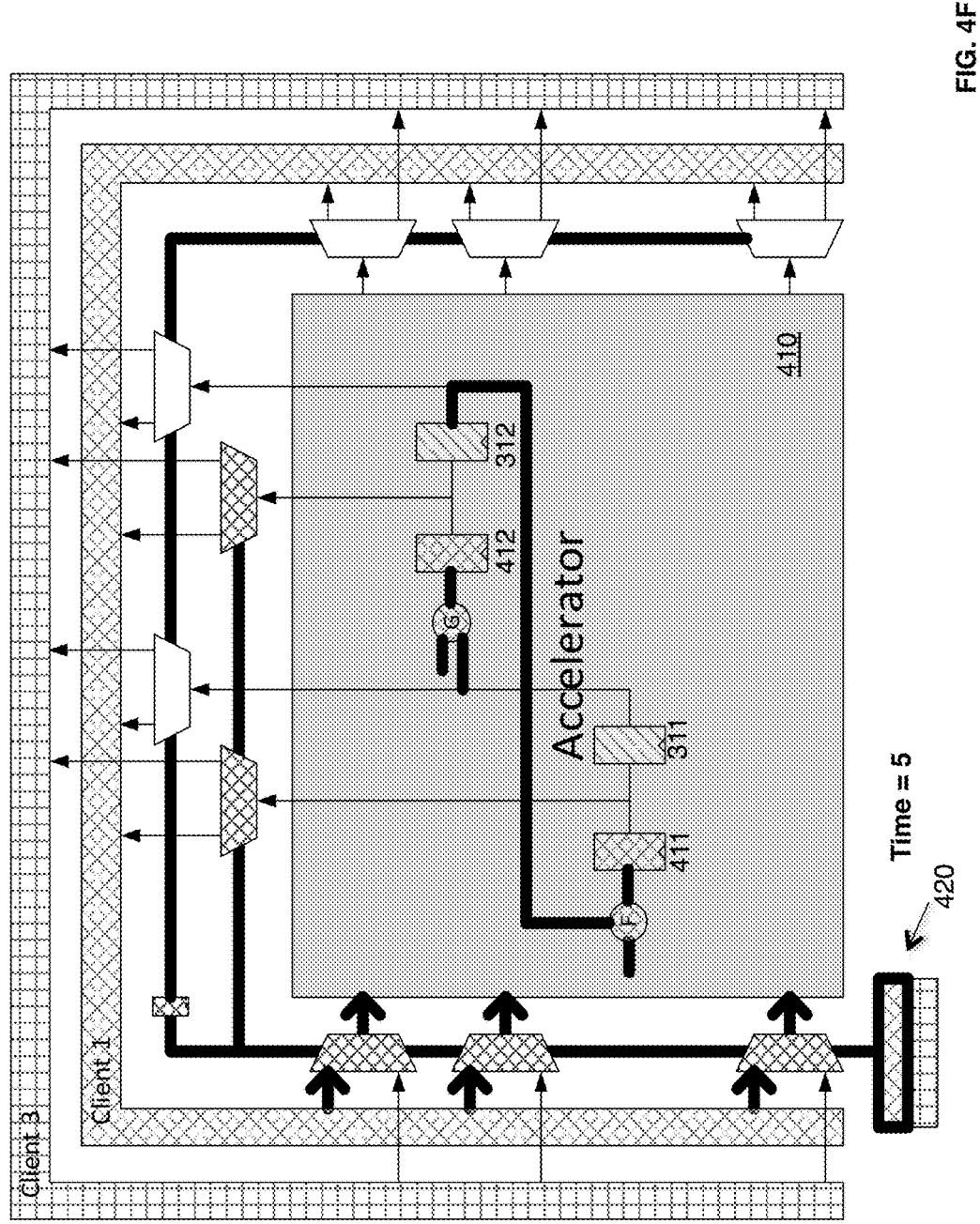
Figure 4G:
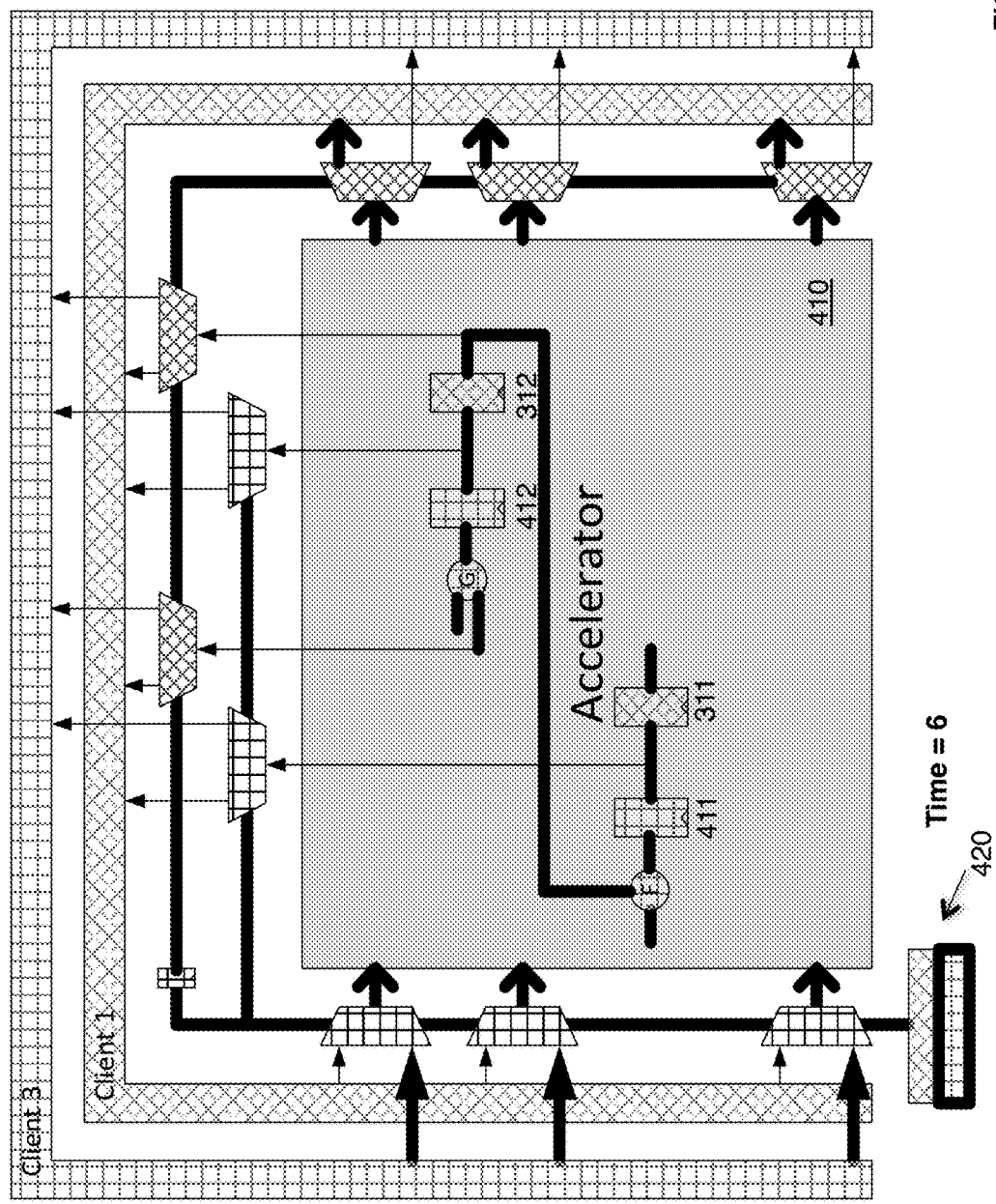

FIGS. 4B-4F illustrate examples of execution sequences of the transformed circuit 410 at different instances of time according to an embodiment of the present disclosure. FIG. 4B illustrates client 1, represented by diamond cross-hatching, transmitting data inputs to the circuit 410, and circuit 410 executing a thread from client 1. The flow of data and control is highlighted with heavily darkened lines. FIG. 4C illustrates client 2, represented by diagonal cross-hatching rising to the right, transmitting data inputs to circuit 410, and circuit 410 executing a thread from client 1 and client 2. Data output corresponding to client 1 is transmitted out of circuit 410. FIG. 4D illustrates client 1 transmitting data inputs to circuit 410, and circuit 410 executing a thread from client 1 and a thread from client 2. Data output corresponding to client 2 is transmitted out of circuit 410. FIG. 4E illustrates the thread from client 2 removed from an execution queue of the thread scheduler. A no operation ("NOP") is scheduled to be executed by the thread scheduler 420. As a result, no data inputs are transmitted to circuit 410. Circuit 410 executes a thread from client 1. Data output corresponding to client 1 is transmitted out of circuit 410. Stale data from client 2 remains at combinational circuit F, combinational circuit G, and registers 411 and 412. FIG. 4F illustrates client 1 transmitting data inputs to circuit 410, and client 410 executing a thread from client 1. Stale data from client 2 remains at registers 311 and 312. Client 3, represented by square cross-hatching, has loaded a thread into the execution queue of the thread scheduler. FIG. 4G illustrates client 3 transmitting data inputs to circuit 410, and circuit 410 executing a thread from client 1 and a thread from client 3. Data output corresponding to 2 is transmitted out of circuit 410. The stale data from client 2 is mixed with the data inputs from client 3.

At times 1-3, FIGS. 4B-4D illustrate the interleaving of threads from client 1 and client 2 proceeding without issue. At time=4, FIG. 4E illustrates a thread from client 2 being removed. However, the data associated from the thread from client 2 is still in the pipeline of circuit 410 at FIGS. 4E, 4F, and 4G. As a result, the data associated from the thread from client 2 (the state of the thread from client 2) could potentially be snooped at times 4-6, represented at FIGS. 4E, 4F, and 4G. This could potentially pose a security issue.

It should be appreciated that temporal virtualization may be extended to support any number of threads by applying C-slow retiming to a circuit and providing appropriate multiplexing and demultiplexing circuitry for the interface of the circuit. The interface may operate to support observation for debugging a thread, check pointing an execution, and thread swapping. According to an embodiment of the present disclosure, when supporting observation for debugging a thread, the interface provides a mechanism to allow each client to access the thread's isolated execution. When supporting observation for check pointing, the interface allows captured state to be replayed if necessary. When supporting observation for check pointing and thread swapping, the interface for the observed state must be sufficient to provide a functional restart and/or thread swap.

Figure 5A:
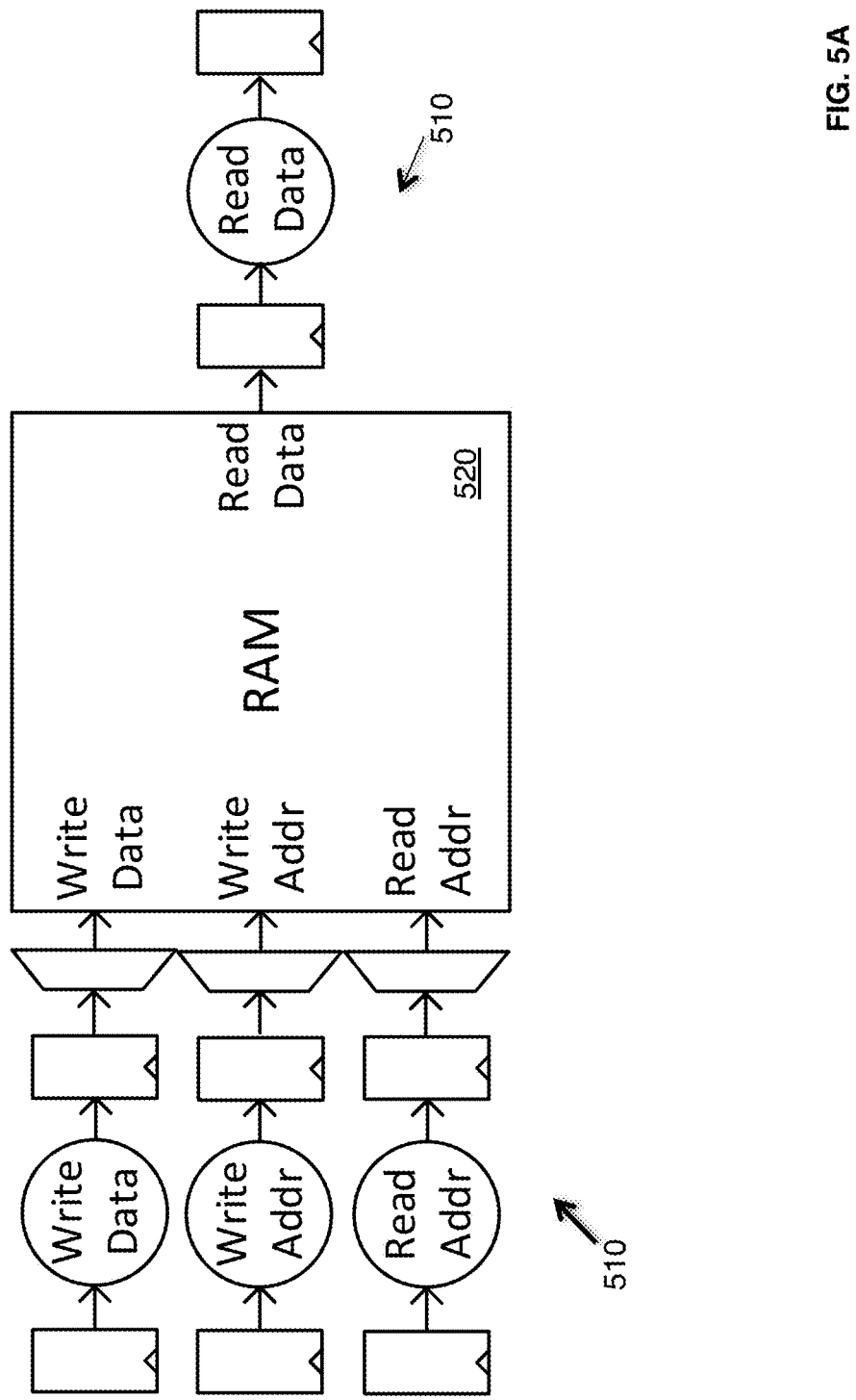
FIGS. 5A-5E illustrate a circuit and memory system, a transformed circuit and memory system that support a plurality of threads of execution, and examples of execution sequences of the transformed circuit and memory system according to an embodiment of the present disclosure.

According to an embodiment of the present disclosure, as C-1 registers are added to support C number of threads, memory states are copied C-1 times. FIG. 5A illustrates an embodiment of a circuit 510 that supports a single thread of execution, and a memory system 520 that supports the circuit 510. The memory system 520 has ports for receiving read addresses, write addresses, and write data. The memory system 520 also has a port for transmitting read data.

Figure 5B:
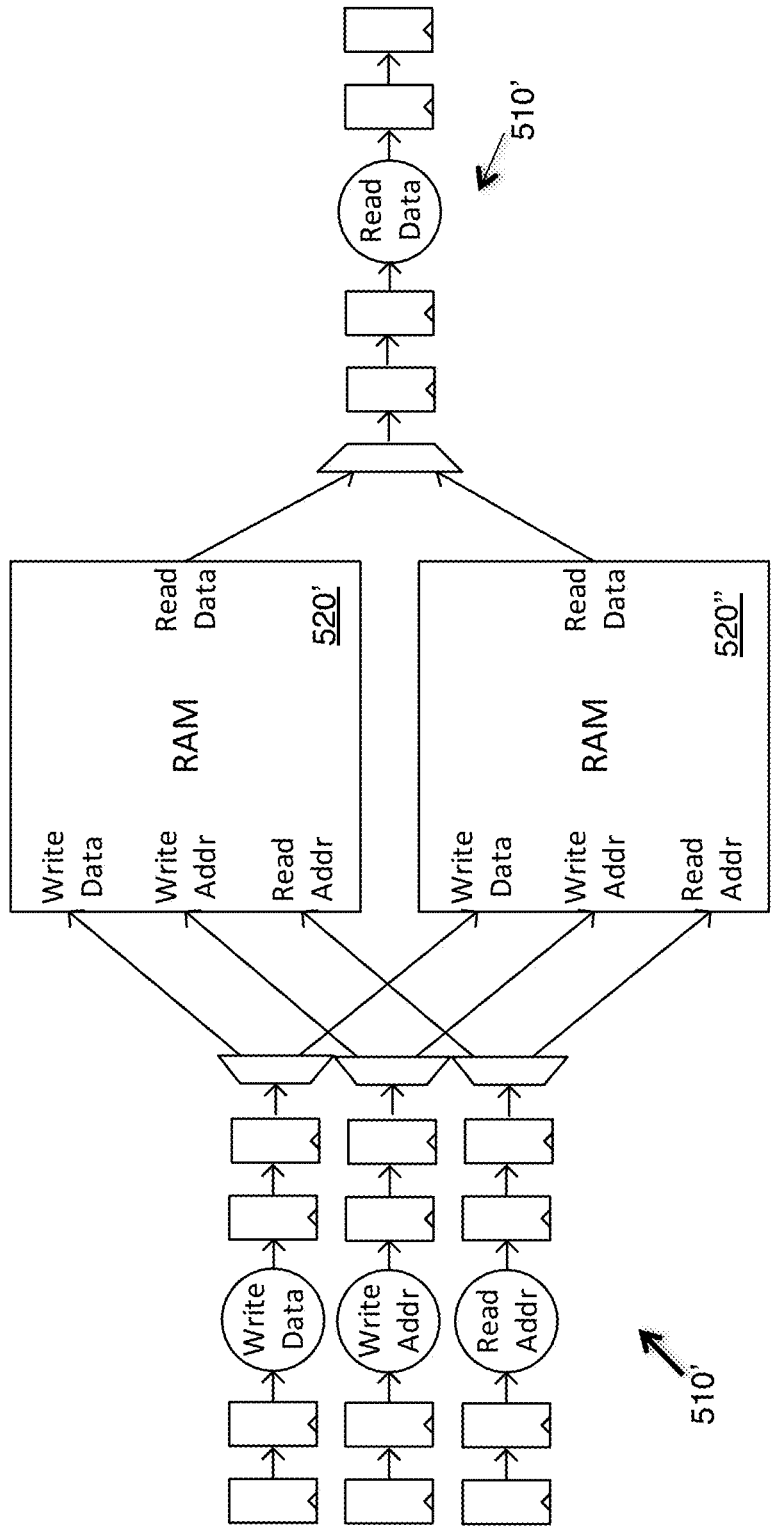

FIG. 5B illustrates a transformed circuit 510' and memory system 520' and 520" interface that supports two threads of execution at an instant of time according to an embodiment of the present disclosure. Utilizing a transformation technique referred to as C-slow retiming transformation, transformed circuit 510' adds C-1 registers before registers that are involved in a feedback path or in a reconvergent fanout, where C is a number of threads supported by the circuit 510'. The added registers provide replicated states for the circuit 510'. The memory system 520' and 520" has been duplicated and data is serialized in and out from it. Although data may also be serialized in and out with the registers, it is less efficient to perform serialization when using a multiplexing system.

Figure 5C:
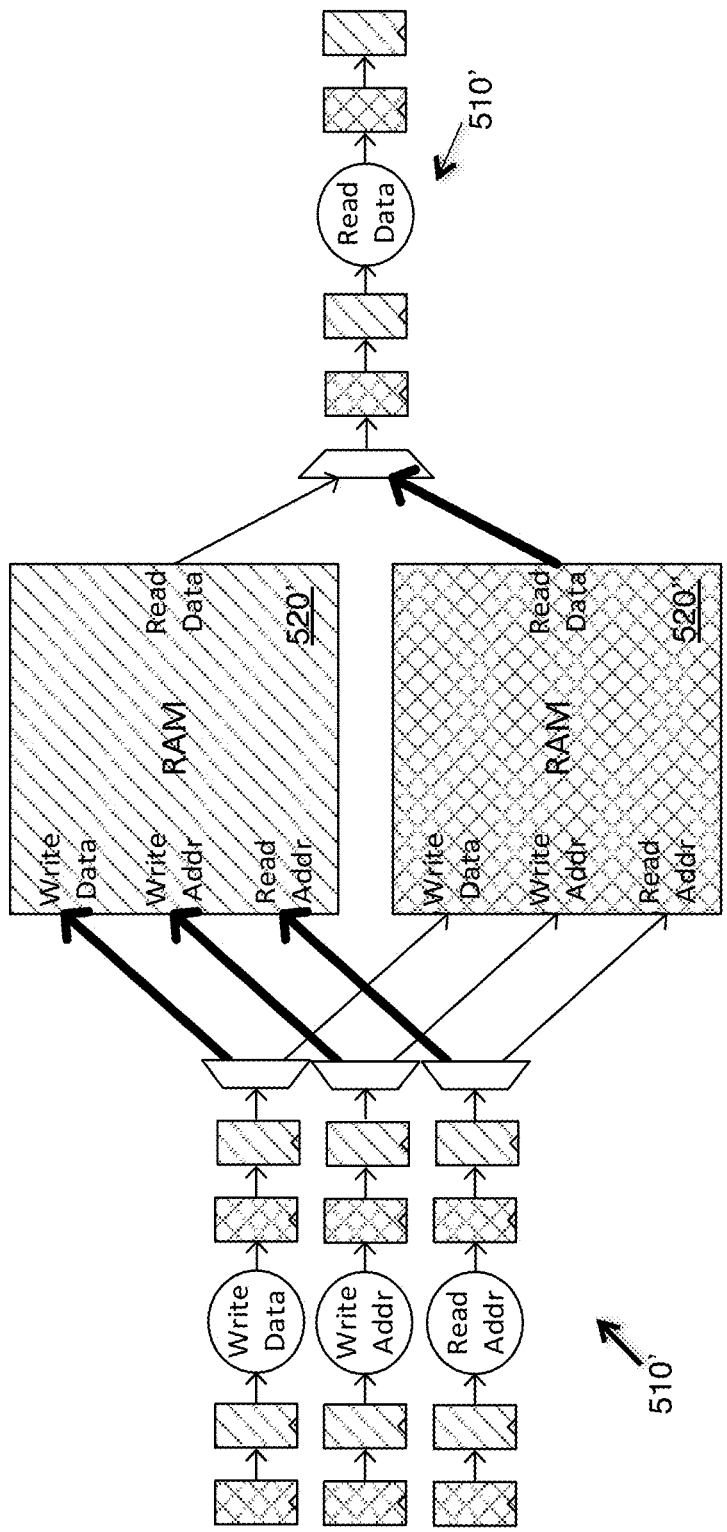
Figure 5D:
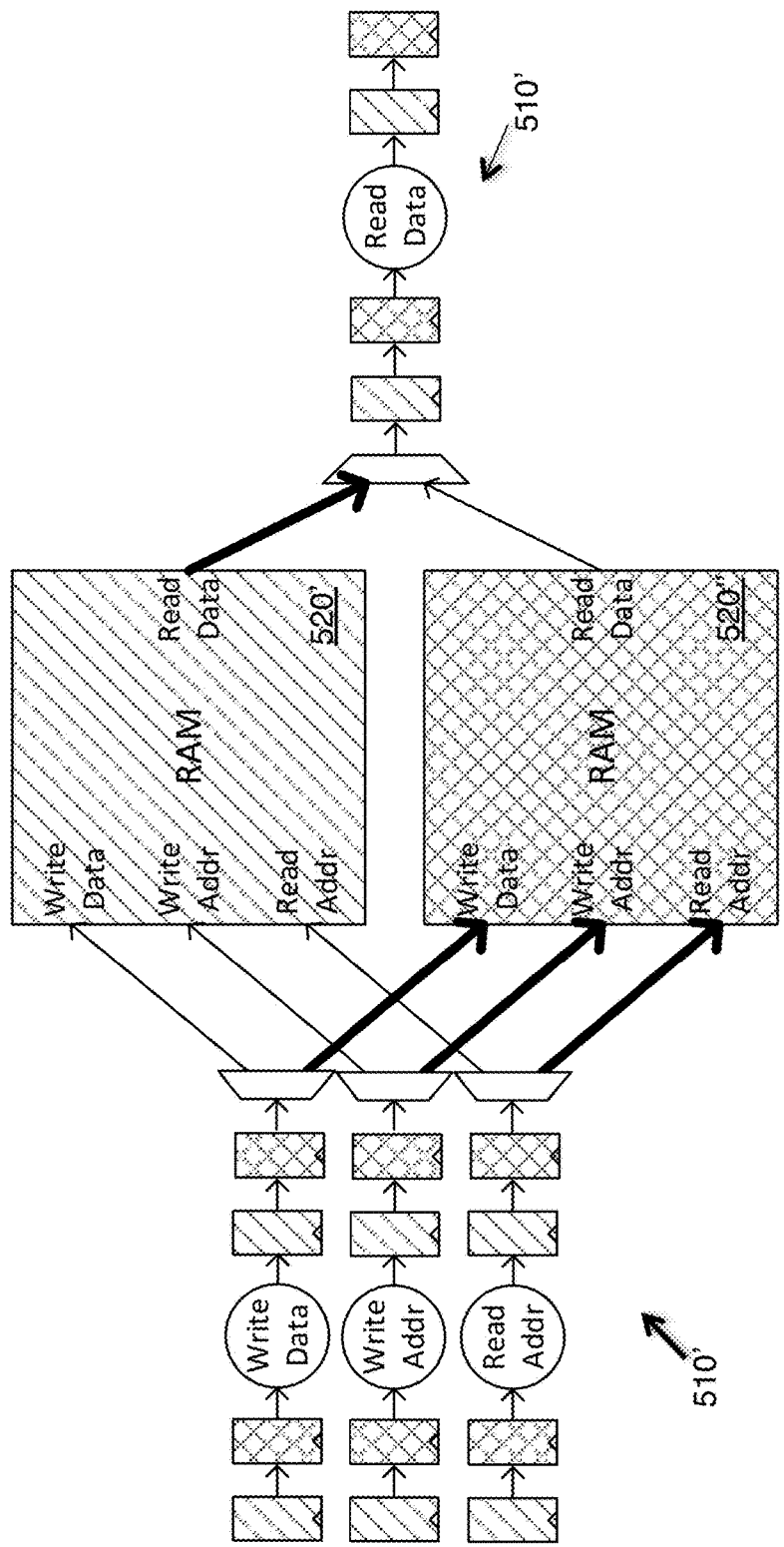

FIGS. 5C and 5D illustrate the movement of threads through the transformed circuit 510' and memory system 520' and 520". As shown, each memory stays with the same thread at all time. Only the multiplexers change with respect to where in the memory system 510' and 520" it directs data to and receives data from.

Figure 6:
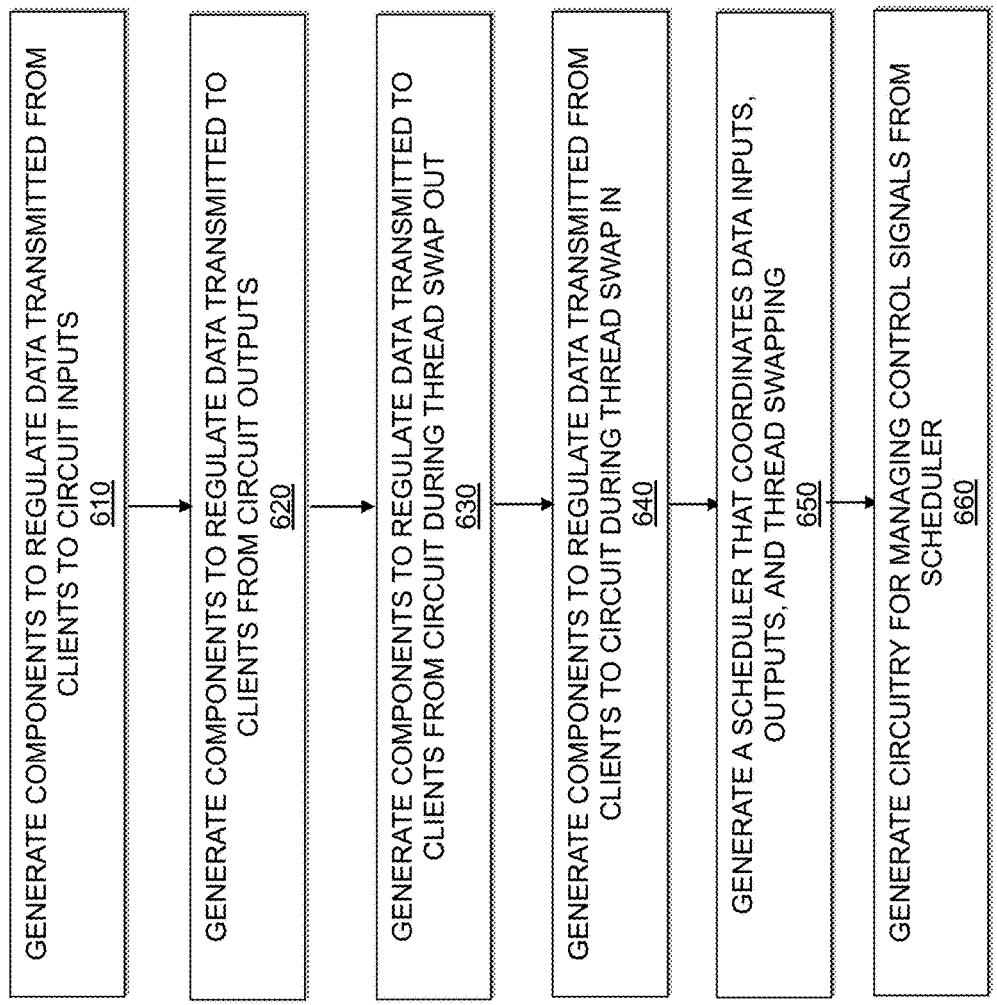
FIG. 6 is a flow chart illustrating a method for generating an interface to generate components for supporting secure multi-threading according to an exemplary embodiment of the present disclosure.

FIG. 6 is a flow chart illustrating a method for generating an interface to generate components for supporting secure multi-threading on a circuit according to an embodiment of the present disclosure. According to an embodiment of the present disclosure, the procedures illustrated in FIG. 6 may be implemented at procedure 240 illustrated in FIG. 2. At 610, components are generated to regulate data transmitted from one or more clients to a circuit input. According to an embodiment of the present disclosure, the components may include one or more multiplexers controlled by a thread scheduler to select data associated from one or more threads executed by one or more clients. The one or more multiplexers may output the selected data to one or more circuit inputs.

At 620, components are generated to regulate data transmitted to one or more clients from one or more circuit outputs. According to an embodiment of the present disclosure, the components may include one or more demultiplexers controlled by the thread scheduler to select an appropriate destination to transmit data from one or more circuit outputs. The one or more demultiplexers may output the data to an appropriate client.

At 630, components are generated to regulate data transmitted to one or more clients from the circuit during thread swap out. According to an embodiment of the present disclosure, the components may include one or more demultiplexers controlled by the thread scheduler to select an appropriate destination to transmit data from one or more registers in the circuit storing state information associated with one or more threads.

At 640, components are generated to regulate data transmitted from one or more clients to the circuit during thread swap in. According to an embodiment of the present disclosure, the components may include one or more multiplexers controlled by the thread scheduler to direct data from the one or more clients to one or more appropriate registers that store state information in the circuit during thread swap in.

At 650, a thread scheduler is generated to coordinate data inputs to the circuit, data outputs from the circuit, and thread swapping. According to an embodiment of the present disclosure, the thread scheduler evaluates threads that are executing and threads that are waiting to be executed and determines which threads to swap out of execution from the circuit and which threads to swap in for execution in the circuit. The thread scheduler coordinates the movement of data between clients executing threads and the circuit to enable time division multiplexing of the circuit. According to an embodiment of the present disclosure, the thread scheduler also schedules the clearing of data associated with threads that are swapped out from registers and memories.

At 660, circuitry is generated for managing control signals from the thread scheduler. According to an embodiment of the present disclosure, the circuitry includes delay registers that pipeline control signals that identify threads which are swapped out so that each client only has access to data associated with its own thread. According to an embodiment of the present disclosure, the thread scheduler outputs a signal that identifies a thread that is active at a current cycle or instant of time. This signal is pipelined properly utilizing the circuitry generated at 660 in order for inputs, observers, and outputs are directed to the appropriate threads at the appropriate time. The swapping in and out of data may take multiple cycles. Circuitry may be included to perform stalling. According to an embodiment of the present disclosure, stalling is achieved by holding the state(s) of the circuit until swapping is complete.

Figure 7A:
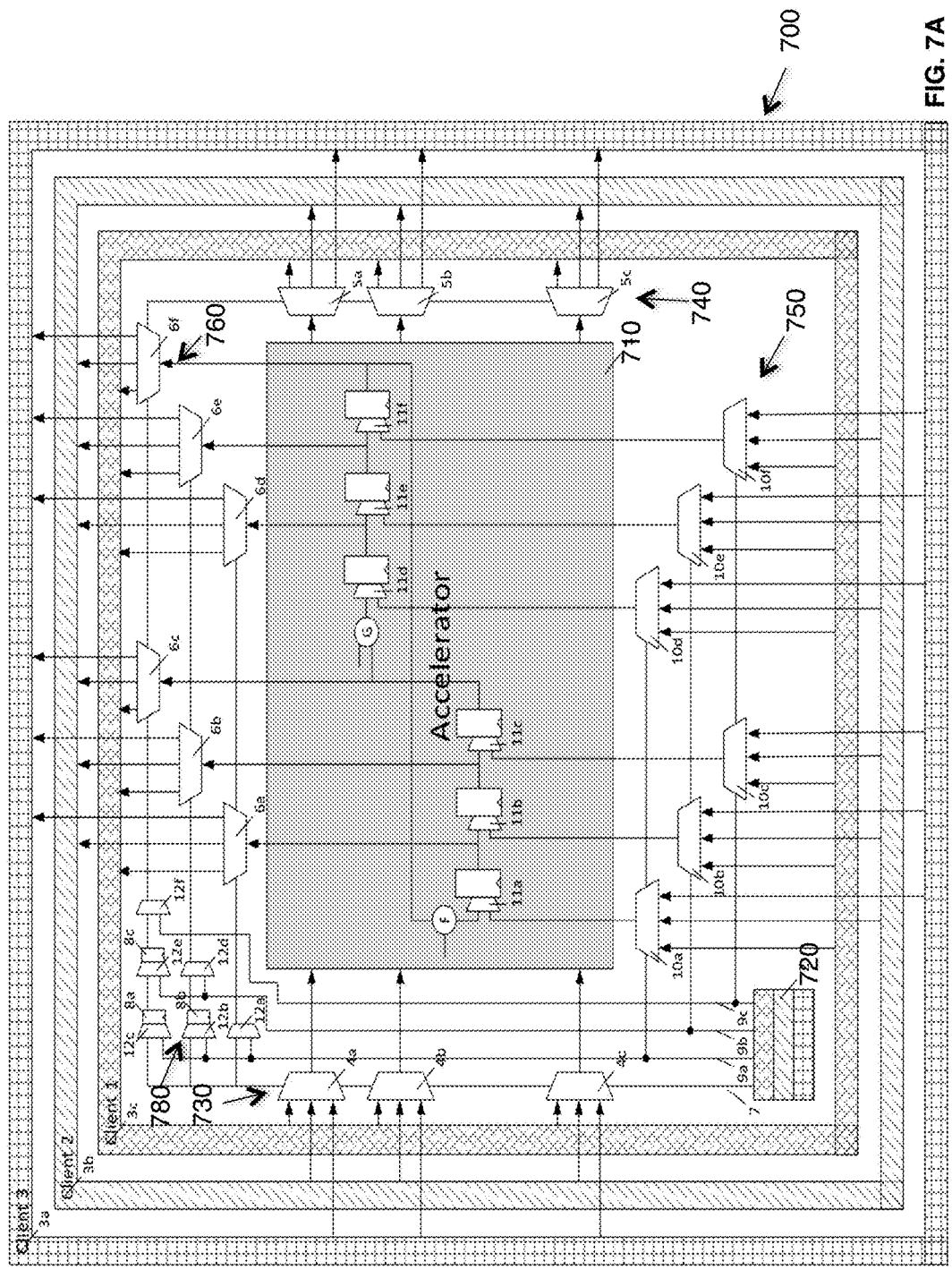
FIG. 7A-B illustrates circuit machinery that performs temporal virtualization according to an exemplary embodiment of the present disclosure.

FIG. 7A illustrates circuit machinery 700 that performs temporal virtualization according to an exemplary embodiment of the present disclosure. The circuit machinery 700 includes a circuit 710 and interface that supports three threads of execution at an instant of time. The circuit machinery 700 has the capability to both swap out a thread as well as swap in a thread into the circuit 710. In order to swap a thread in, the circuit machinery 700 is able to identify an empty thread slot, utilize its machinery to swap the thread's state (data) into the empty slot, and update the machinery where the thread has been inserted. The circuit machinery 700 includes a plurality of multiplexers 10a-10f that allows a thread to be swapped into an empty slot. The circuit machinery 700 also includes a plurality of demultiplexers The circuit machinery 700 includes a circuit 710. The circuit 710 may be a register transfer level (RTL) accelerator which may be implemented by any legal synthesizable RTL. The circuit 710 may be C-slowed by 3 to allow the circuit 710 to support three threads of execution at an instant time. It should be noted that only the state of the circuit 710 is replicated C times, not the combinational logic in the circuit 710. In this embodiment, the state that is replicated would include information or data that may be stored in both registers and memories. Clients 3a-3b represent three clients each executing a thread. It should be appreciated the number of threads executed may scale with the factor of C-slow retiming applied. The threads executed by the clients produce inputs, consume outputs, observe selected state for debug and/or thread swapping, and swap a thread into the circuit 710. Multiplexers 11a-11f ensures that new threads that are swapped into the circuit 710 swap in their state (data) into the appropriate register in the circuit 710.

Figure 7B:
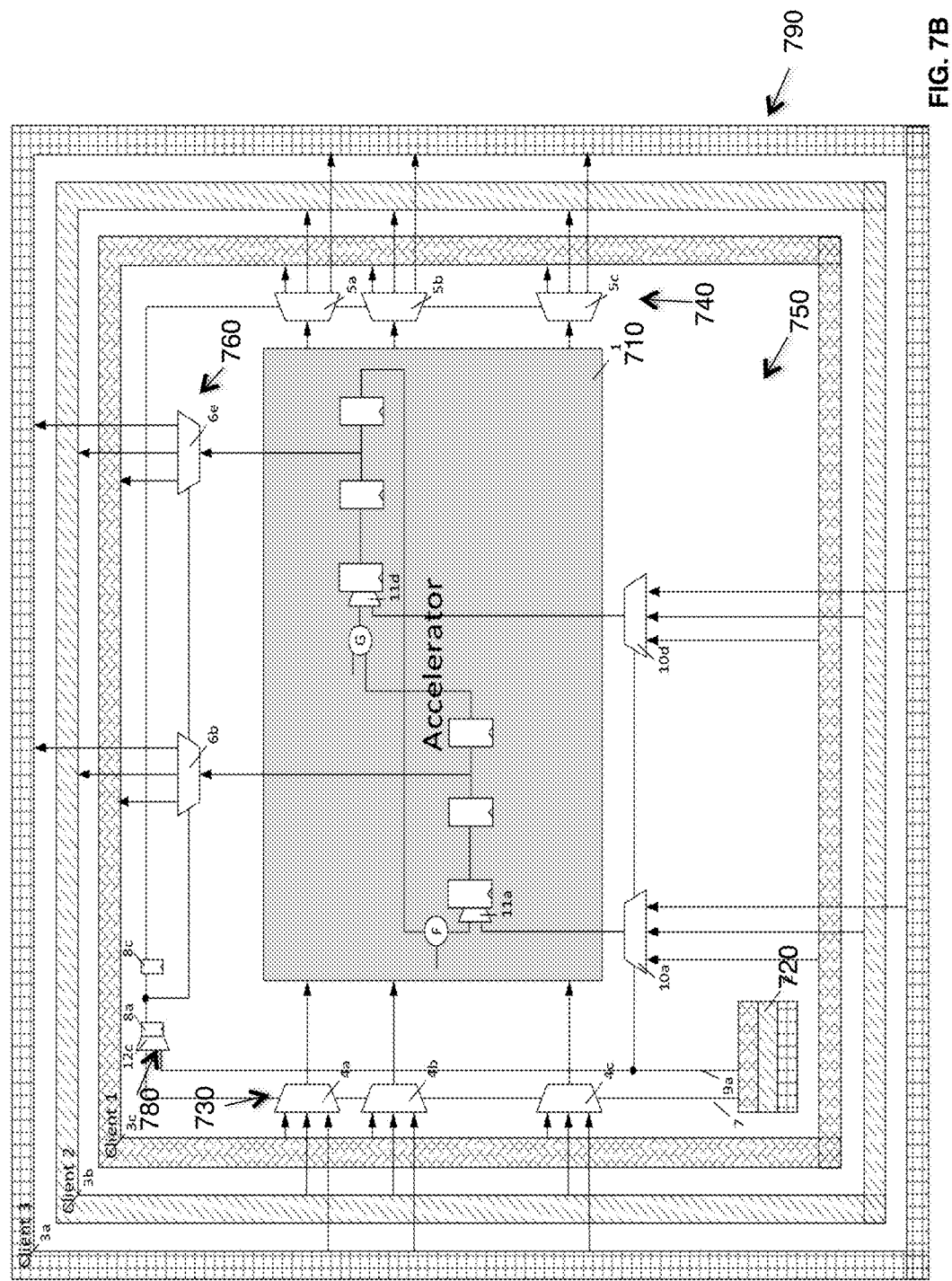

The circuit machinery 700 includes an input interface 730 that is implemented by a plurality of multiplexers 4a-4c. The input interface 730 interleave input from threads under control of a thread scheduler 720. The circuit machinery 700 includes an output interface 740 that is implemented by a plurality of de-multiplexers 5a-5c. The output interface 740 provides clients 3a-3c with access to their thread's outputs. The output interface 740 is under control of the thread scheduler 720. The circuit machinery 700 includes swap-out interface 760 that is implemented by a plurality of de-multiplexers 6a-6f. The swap-out interface 760 provide clients 3a-3c with access to their thread's executing state. Although all states shown in FIG. 7A are tapped, it should be appreciated that access to a subset of the states may be provided and the multiplexers shown may be depopulated. FIG. 7B illustrates an example of circuit machinery 790 that has been minimized to access a subset of states, but still supports temporal virtualization. Referring back to FIG. 7A, the circuit machinery 700 includes swap-in interface 750 that is implemented by a plurality of multiplexers 10a-10f. The swap-in interface 750 allow threads from clients 3a-3c to be swapped into the circuit 710.

The circuit machinery 700 includes a thread scheduler 720. The thread scheduler 720 operates as the controller for the execution of threads. The thread scheduler generates a thread identifier 7 that is broadcasted to all of the interfaces 730, 740, 750, and 760 to allow for appropriate isolation of threads. The thread scheduler 720 also generates a plurality of control signals 9a-9c that indicate when a new thread is to be swapped-into the circuit 710. The control signals 9a-9c are transmitted to swap-in interface 750 to direct transmission of state information (data) corresponding to the thread to be swapped-in to the appropriate registers in the circuit 710. The control signals 9a-9c are also transmitted to swap-out interface 760 to direct transmission of state information corresponding to the thread to be swapped out to the appropriate thread. Control signal management circuitry 8a-8c, which are implemented by delay registers, operate to pipeline thread identifiers generated by the thread scheduler 720 to the appropriate de-multiplexer in the swap-out interface 760. This ensures that each client only has access to data associated with their own thread. Multiplexers 12a-12f enable new thread's thread identifier to be swapped into the thread control so that the proper isolation is maintained between threads.

Although FIG. 7A illustrates configuration of the circuit machinery 700 to occur over a single cycle, it should be appreciated that other configurations may be implemented where the circuit 710 is stalled and inputs and threads sent in over multiple cycles, and outputs and threads sent out over multiple cycles can be constructed following the idea presented. According to an embodiment of the present disclosure, stalling is achieved by holding the state(s) of the circuit machinery 700 for a plurality of cycle operations until swapping is completed.

Figure 8A:
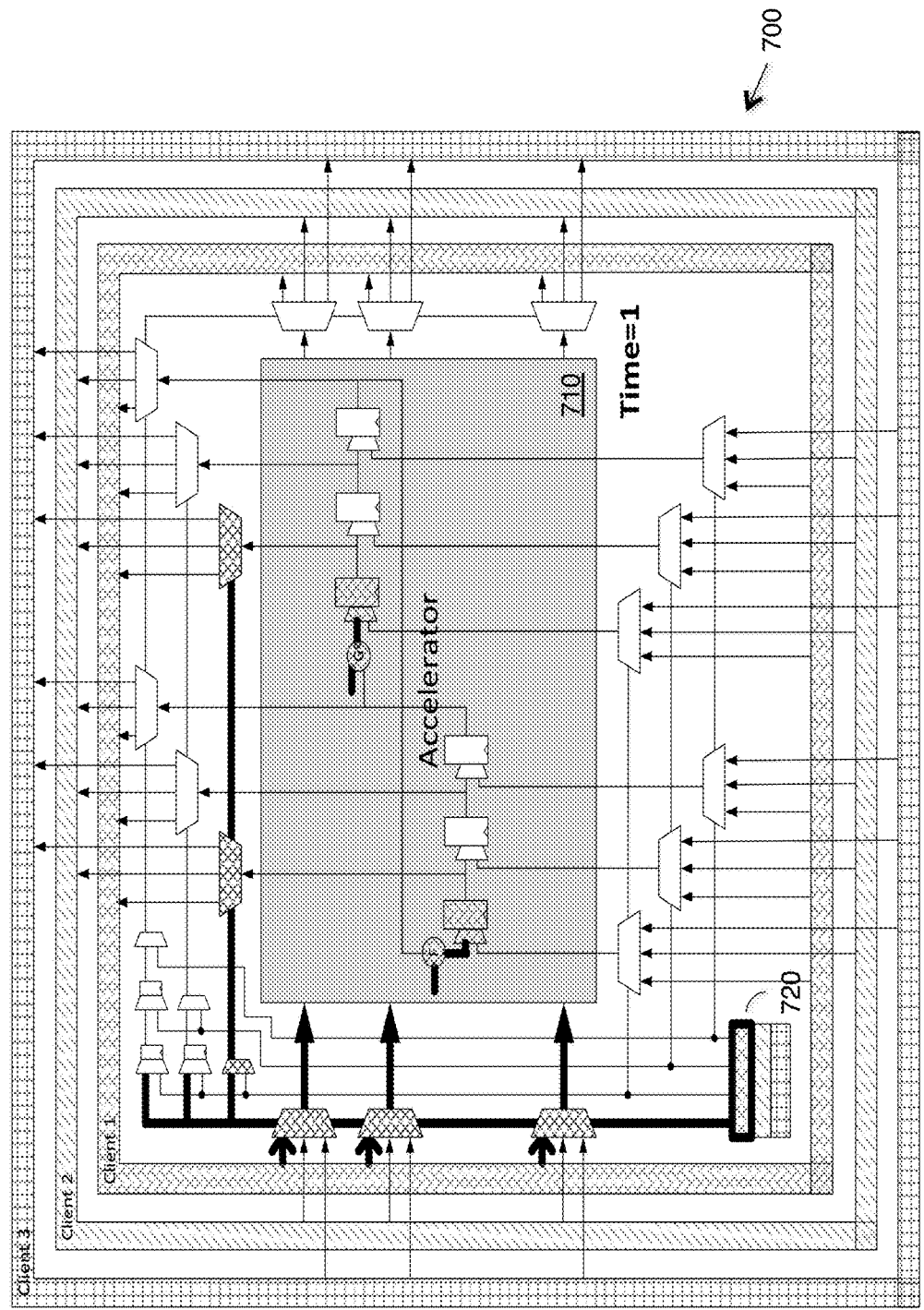
FIGS. 8A-8I illustrate examples of execution sequences of a circuit machinery according to an exemplary embodiment of the present disclosure.

FIGS. 8A-8I illustrate examples of execution sequences of the circuit machinery 800 according to an embodiment of the present disclosure. FIG. 8A illustrates client 1, represented by diamond cross-hatching, transmitting data inputs to the circuit 710, and circuit 710 executing a thread from client 1. The flow of data and control is highlighted with heavily darkened lines.

Figure 8B:
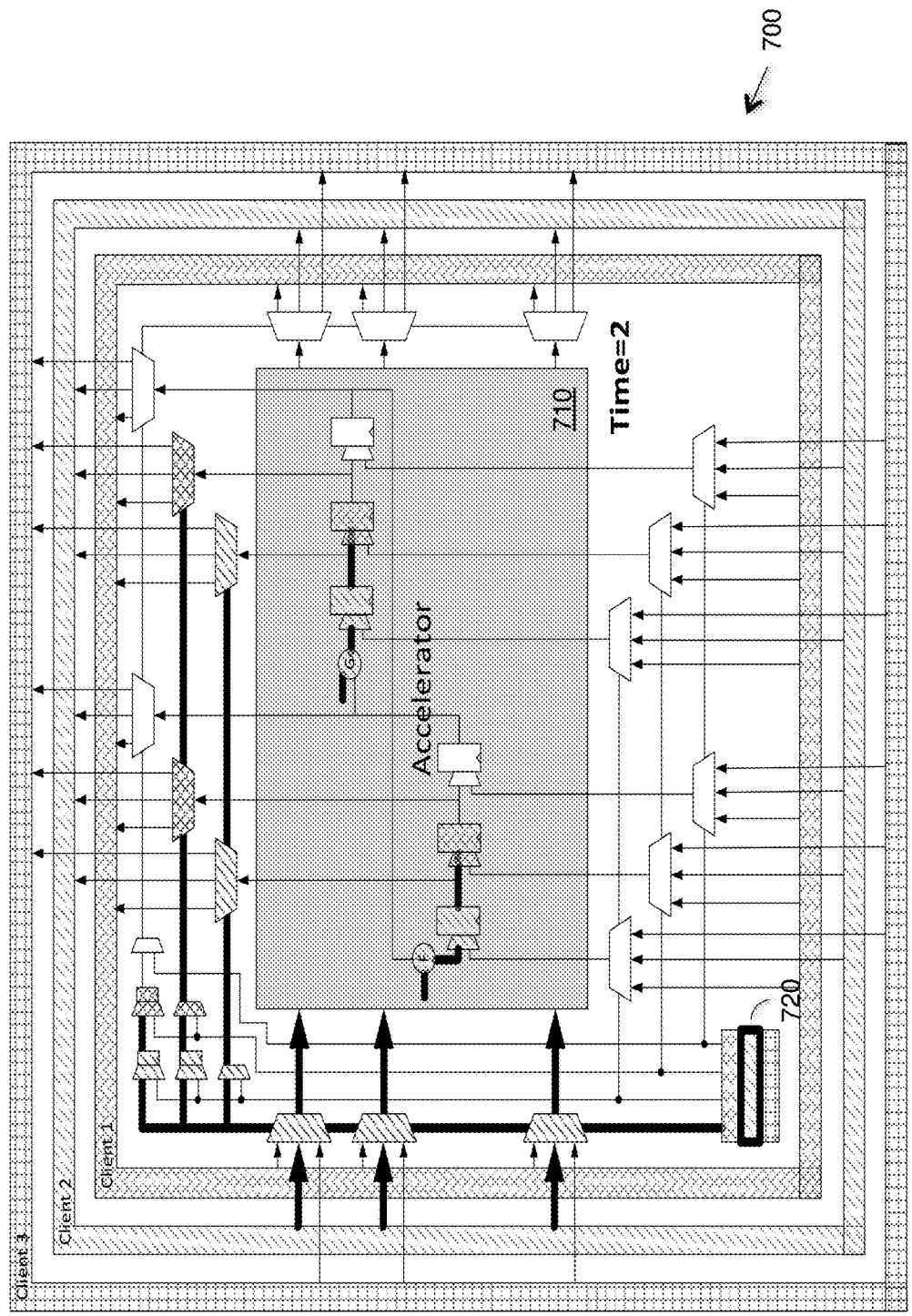

FIG. 8B illustrates client 2, represented by diagonal cross-hatching rising to the right, transmitting data inputs to circuit 710, and circuit 710 executing a thread from client 1 and client 2.

Figure 8C:
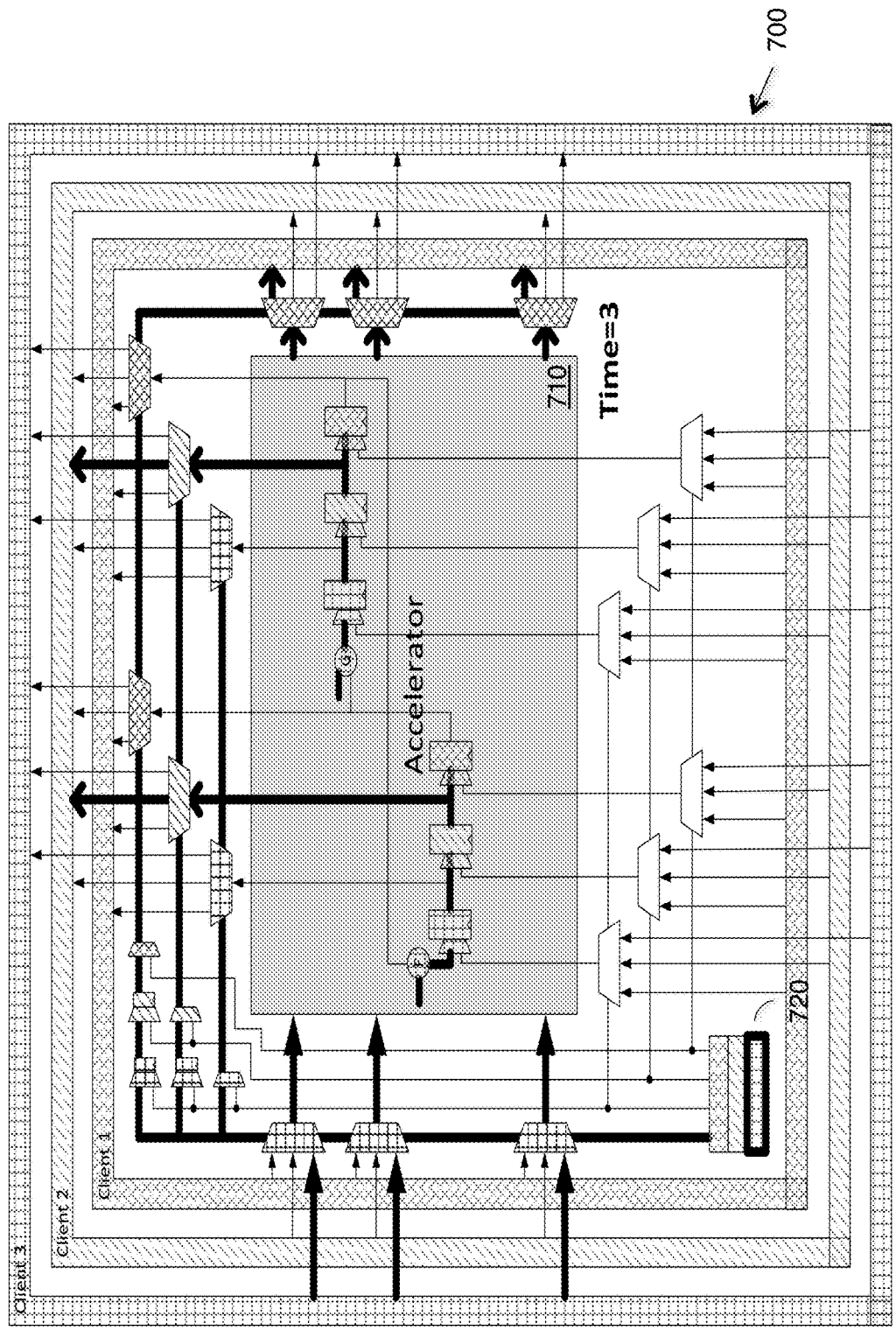

FIG. 8C illustrates client 3 transmitting data inputs to circuit 710, and circuit 710 executing a thread from client 1, a thread from client 2, and a thread from client 3. Data output corresponding to client 1 is transmitted out of circuit 710. The data associated with the thread from client 2 is swapped out of the circuit 710.

Figure 8D:
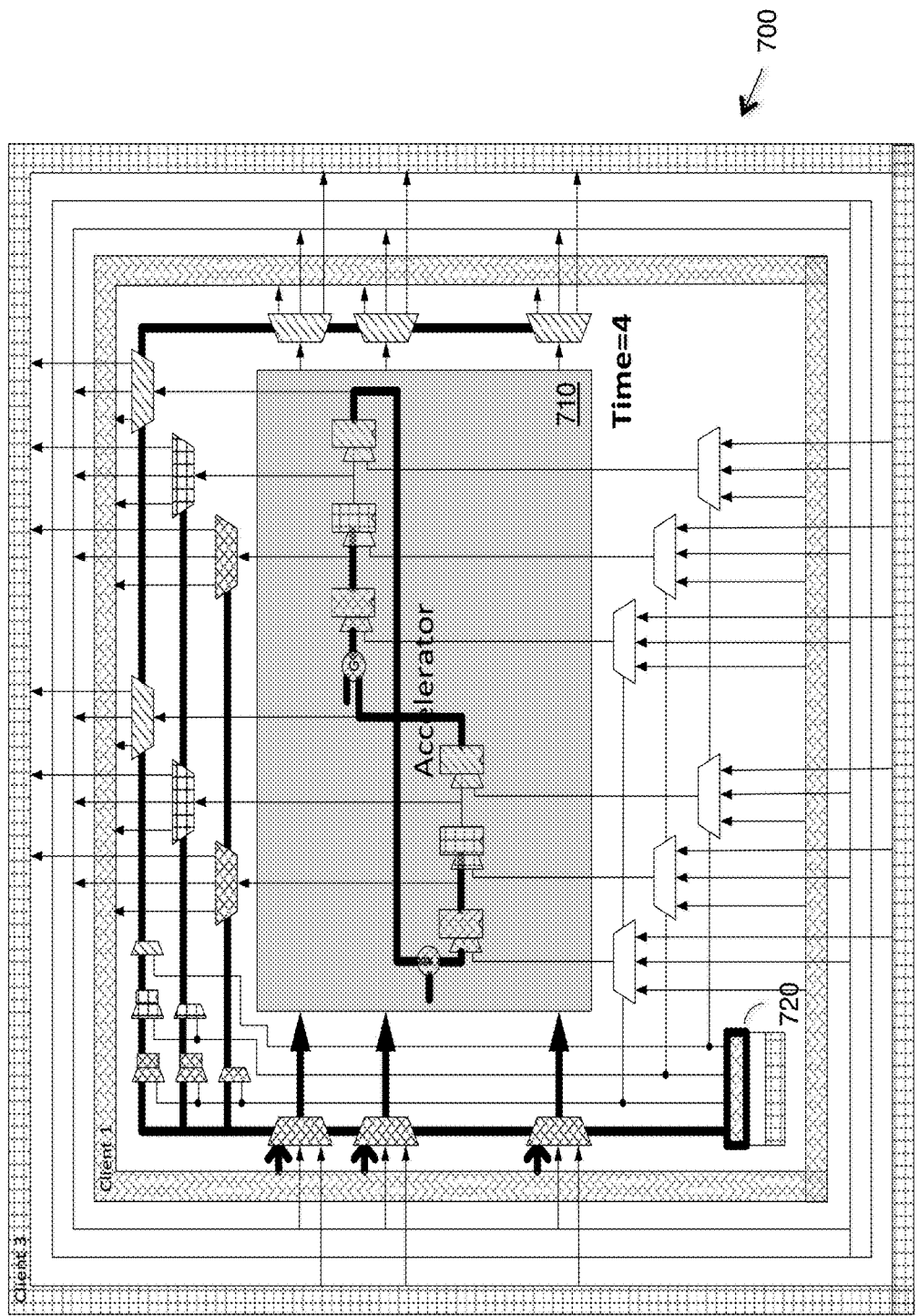

FIG. 8D illustrates the thread from client 2 removed from an execution queue of the thread scheduler 720. Client 1 transmits data inputs to the circuit 710, and circuit 710 executes a thread from client 1 and a thread from client 3. Data associated with the thread from client 2 remains in circuit 720 and is stale. No client is occupying client 2's previous position to snoop its execution.

Figure 8E:
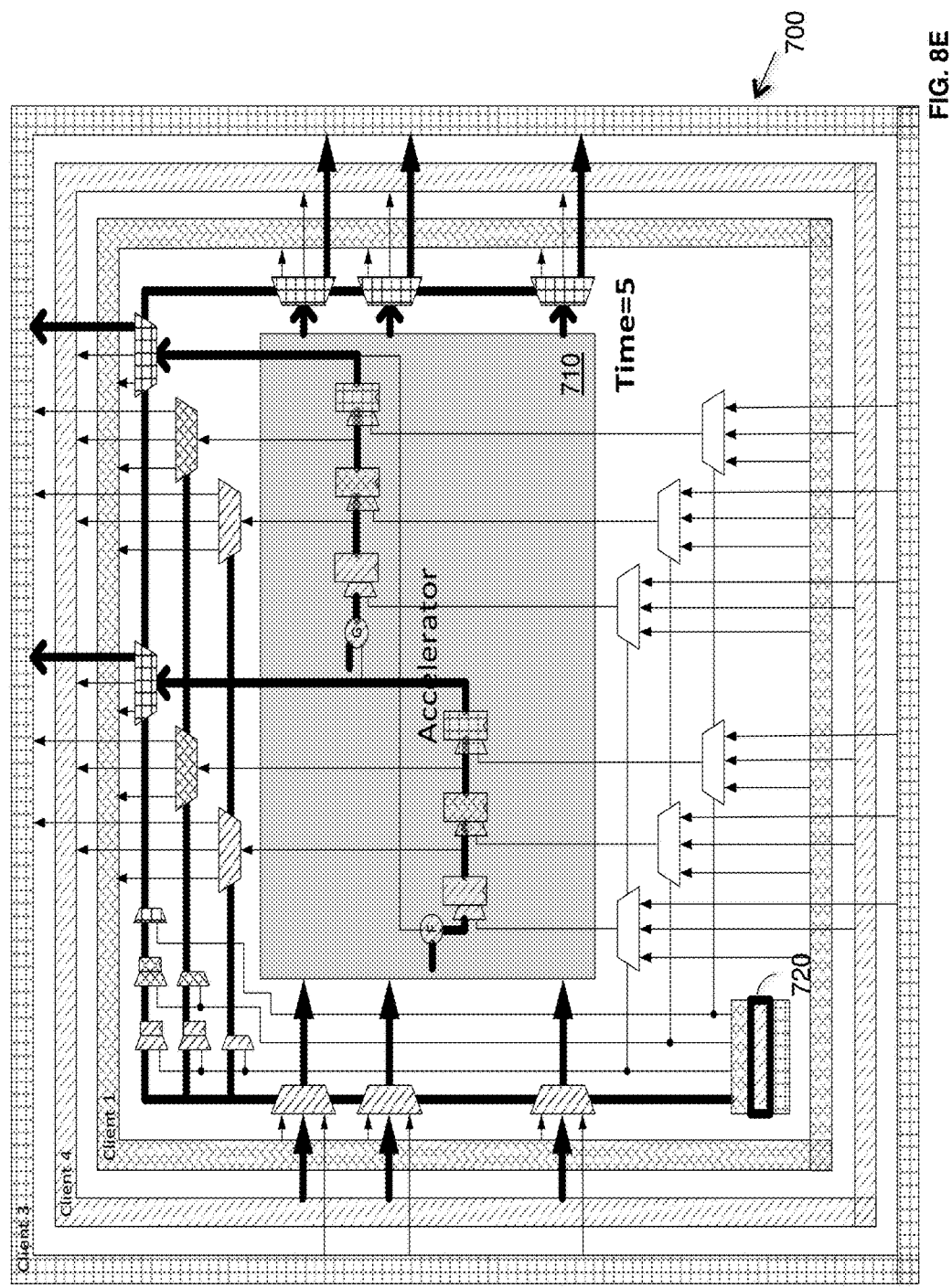

FIG. 8E illustrates a thread from client 4, represented by diagonal cross-hatching rising to the left, swapped into the execution queue of the thread scheduler 720. Client 4 transmits data inputs to circuit 710, and client 710 is executing a thread from client 1, a thread from client 4, and a thread from client 3. It should be noted that client 4 interacts with the stale data from client 2. This may pose a security issue if client 2 does not trust client 4 since snooping is possible by client 4. Data output corresponding to client 3 is transmitted out of circuit 710. The data associated with the thread from client 3 is swapped out of circuit 710.

Figure 8F:
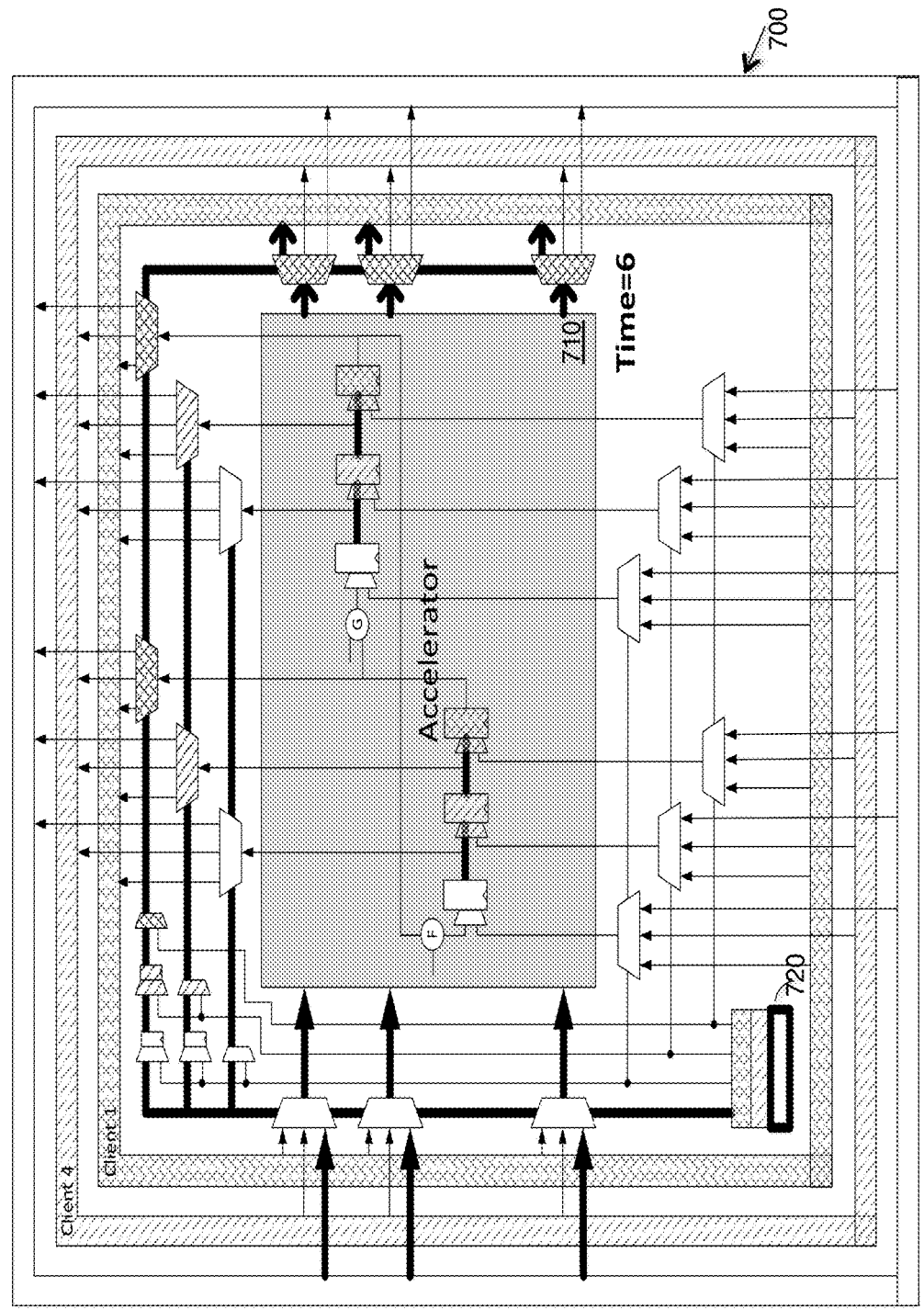

FIG. 8F illustrates the position previously occupied by the thread from client 3 in the thread scheduler 720 empty. A no operation is injected since no thread is occupying thread slot 3 previously occupied by the thread from client 3. The circuit 710 executes the no operation, a thread from client 4, and a thread from client 1. Data output corresponding to client 1 is transmitted out of circuit 710. It should be noted that the no operation interaction with stale data associated with the thread from client 3 (not shown) may be observable when a new client occupies empty thread slot 3.

Figure 8G:
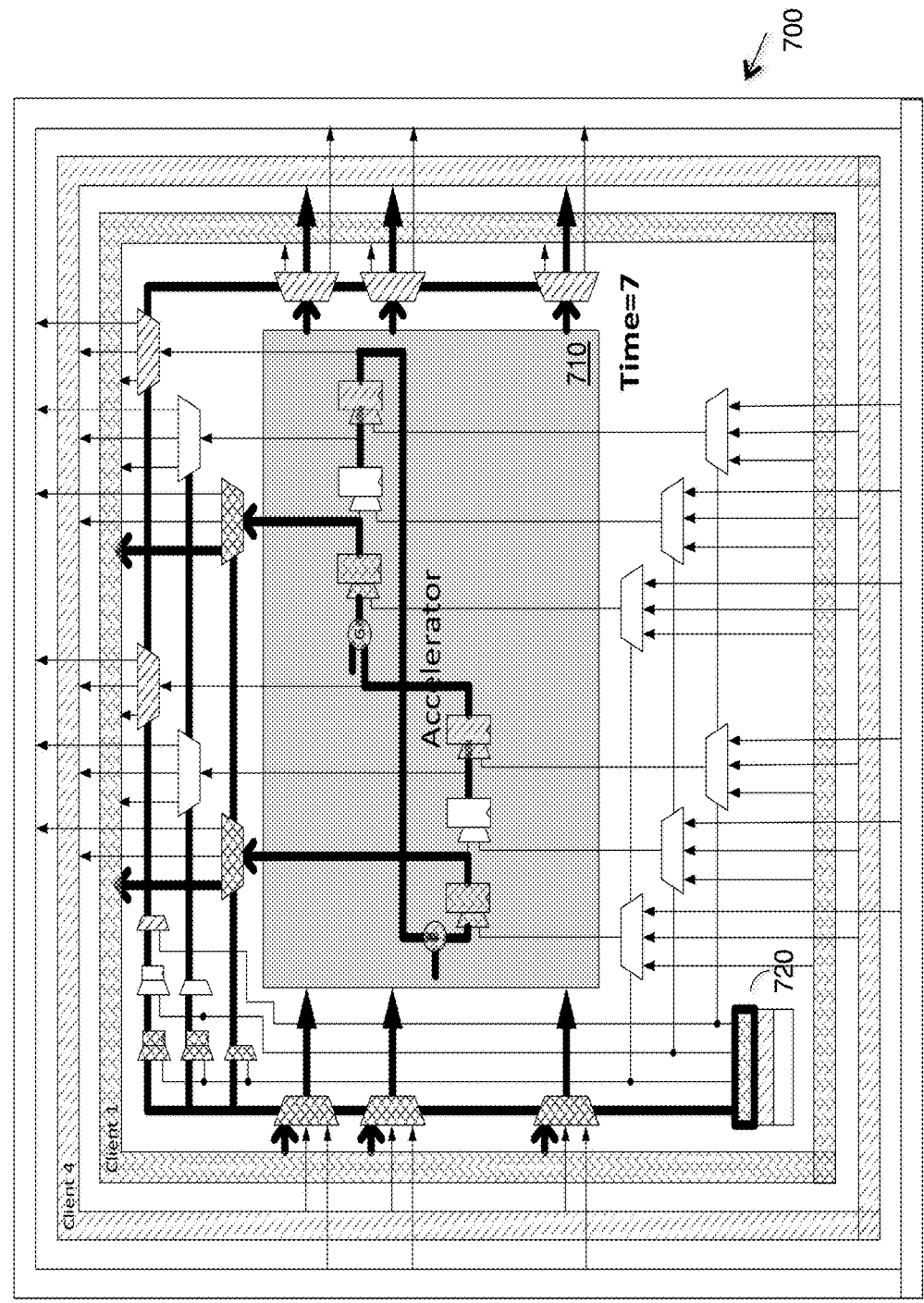

FIG. 8G illustrates client 1 transmitting data inputs to the circuit 710, and circuit 710 executing a thread from client 1, the no operation, and thread from client 4. Data output corresponding to client 4 is transmitted out of circuit 710. The data associated with the thread from client 1 is swapped out of circuit 710.

Figure 8H:
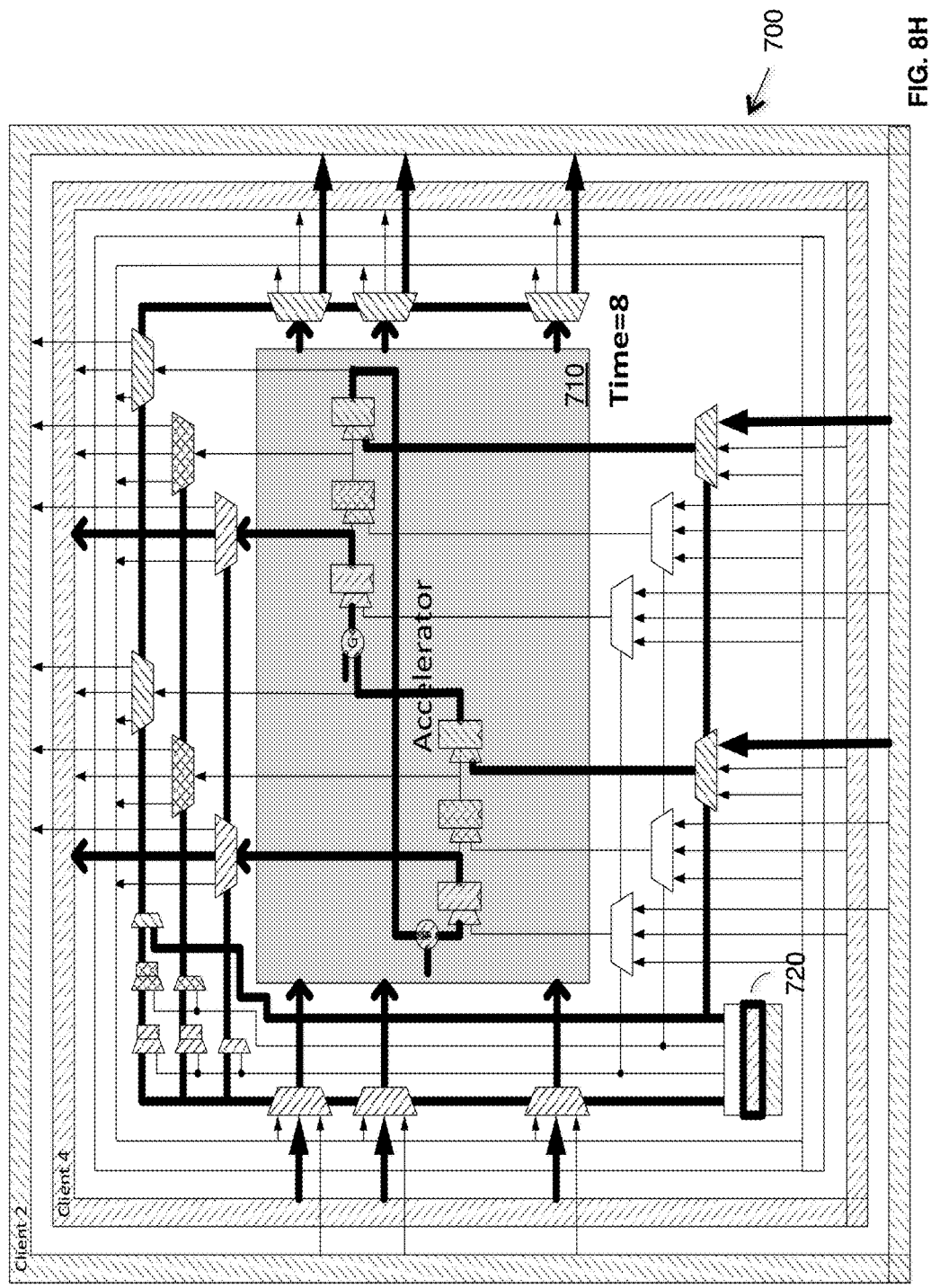

FIG. 8H illustrates client 4 transmitting data inputs to the circuit 710, and circuit 710 executing a thread from client 4 and a thread from client 1. The data associated with the thread from client 1 is stale. A thread from client 2 is swapped into the empty slot 3. Data output corresponding to client 2 is transmitted out of circuit 710. The data associated with the thread from client 4 is swapped out of circuit 710. No client is occupying client 1's previous position to snoop its execution.

Figure 8I:
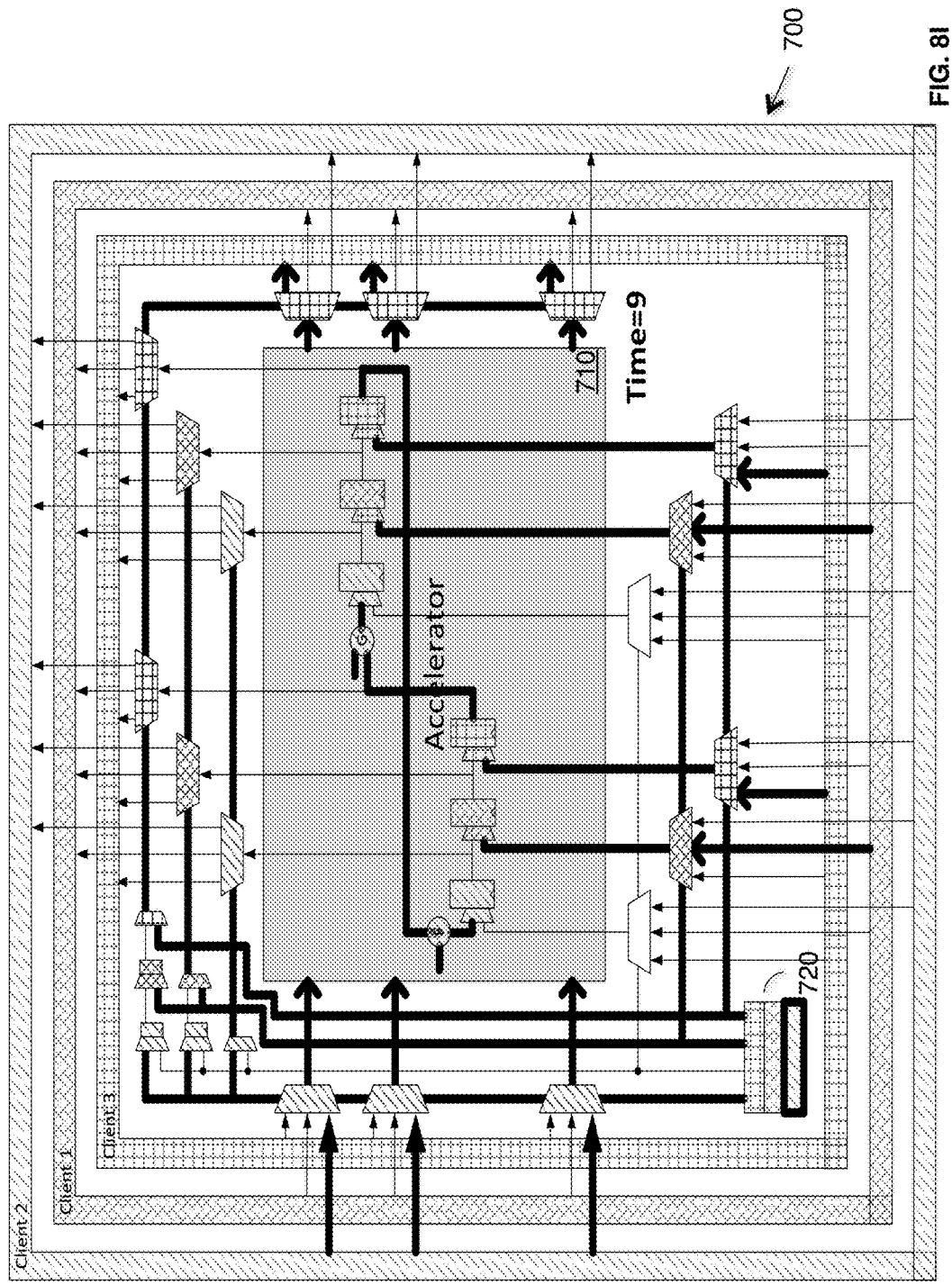

FIGS. 8A-8C illustrate the interleaving of threads from clients 1, 2, and 3. At FIG. 8C, the thread from client 2 is swapped out and slot 2 in the execution queue for thread scheduler 720 is open for a new thread. Although the data associated with the thread from client 2 is swapped out, the state of the thread is still in the circuit 720 pipeline as shown in FIG. 8D. This is not a security issue at the instant of time illustrated in FIG. 8D as the thread client slot that could be reading the data is empty. However, as shown in FIG. 8E, client 4 mixes with client 2's stale state. If client 2 does not trust client 4, additional measures should be taken to provide appropriate isolation. In FIG. 8F, the empty slot left by swapping out client 3's thread results in a no operation executing. This no operation executes with stale data associated with the thread executed by client 3. The execution of the circuit 720 continues with the thread from client 1 being swapped out as shown in FIG. 8G. In FIG. 8H, the thread from client 2 is swapped in. It should be noted that state or data associated with a swapped in thread may be swapped into any empty slot. FIG. 8I illustrates a thread from client 1 and a thread from client 2 simultaneously being swapped in.

Figure 9A:
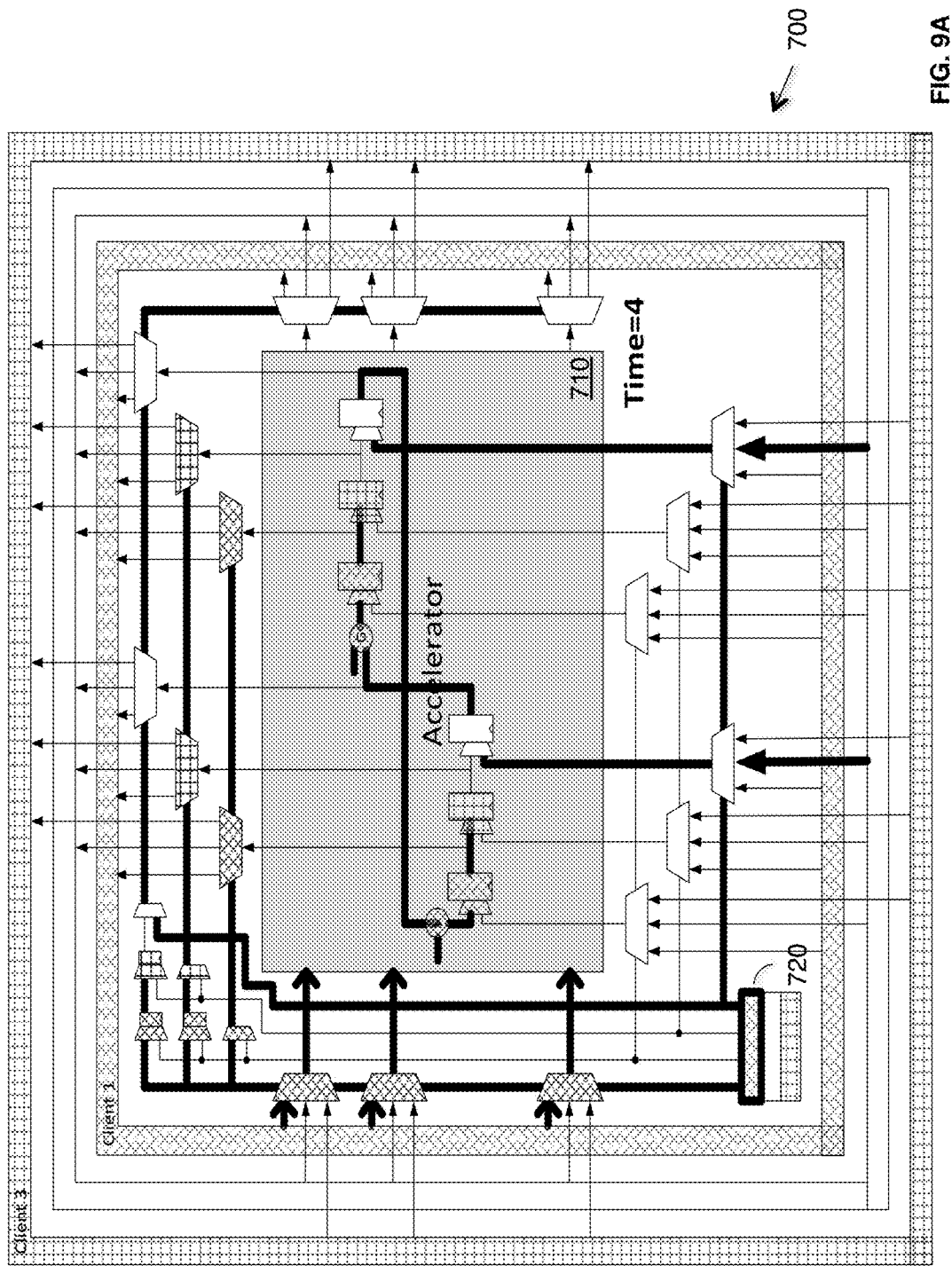
FIGS. 9A-9B illustrate examples of secure execution sequences of a circuit machinery according to an exemplary embodiment of the present disclosure.
Figure 9B:
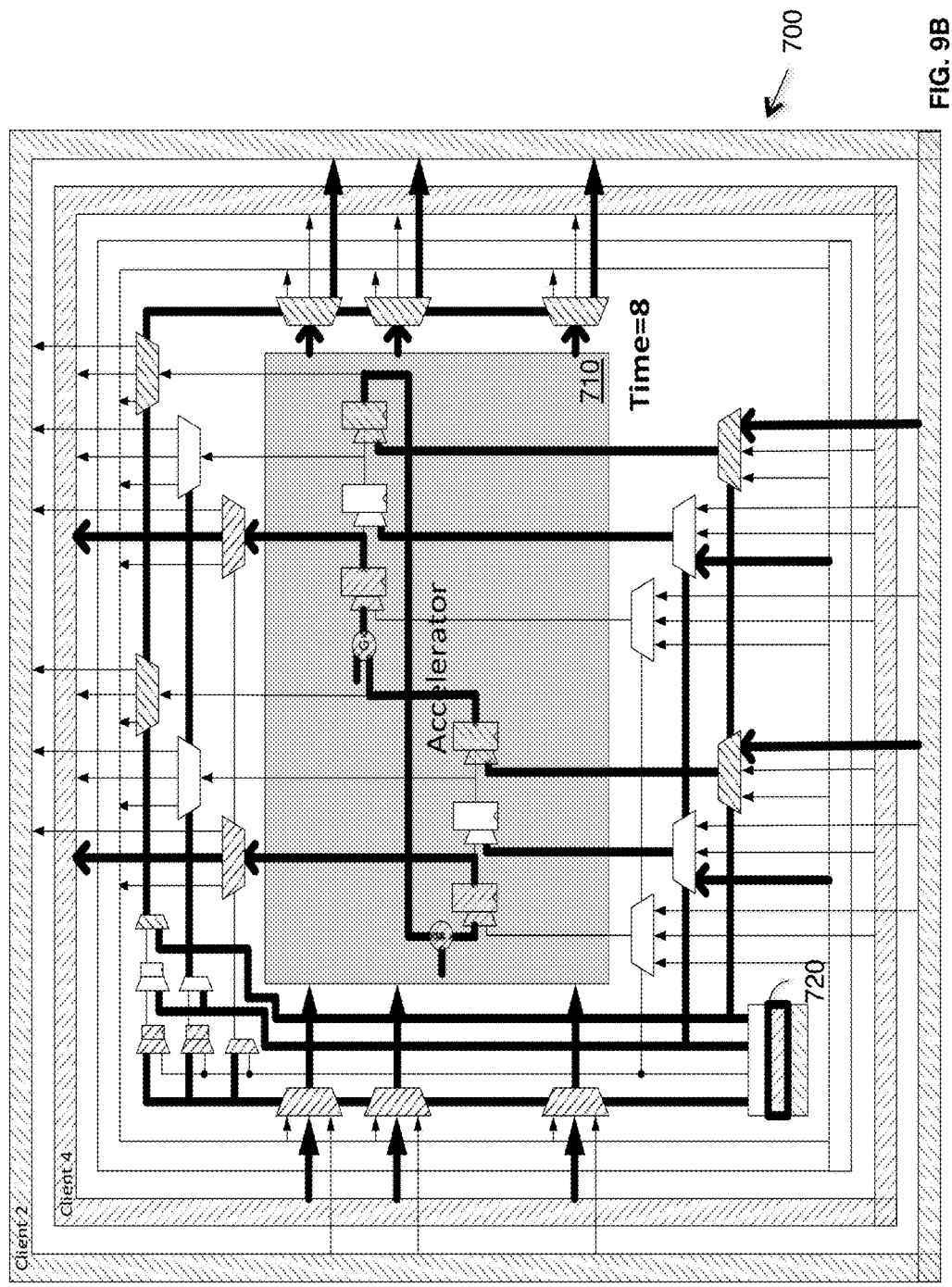

FIGS. 9A and 9B illustrate examples of secure execution sequences of a circuit machinery according to an exemplary embodiment of the present disclosure. According to an embodiment of the present disclosure, the security issue associated with having stale data or a stale state accessible to an untrusted client may be solved by using an empty thread slot to clear the stale data or the stale state to prevent data associated with a thread that is swapped out to be utilized by another thread. For example, at time=4, in place of the procedures performed by the thread scheduler 720 as illustrated in FIG. 8D, the thread scheduler 720 may inject a clear state for the empty slot 2 as illustrated in FIG. 9A. As a result, the data associated with the thread of client 2 is cleared. Furthermore, at time=8, in place of the procedures performed by the thread scheduler 720 as illustrated in FIG. 8H, the thread scheduler 720 may inject a clear slot for the empty slot 1 as illustrated in FIG. 9B. As a result, the data associated with the thread of client 1 is cleared. It should be appreciated that clearing the data may involve writing zeroes or other data in place of the stale data.

Figure 5E:
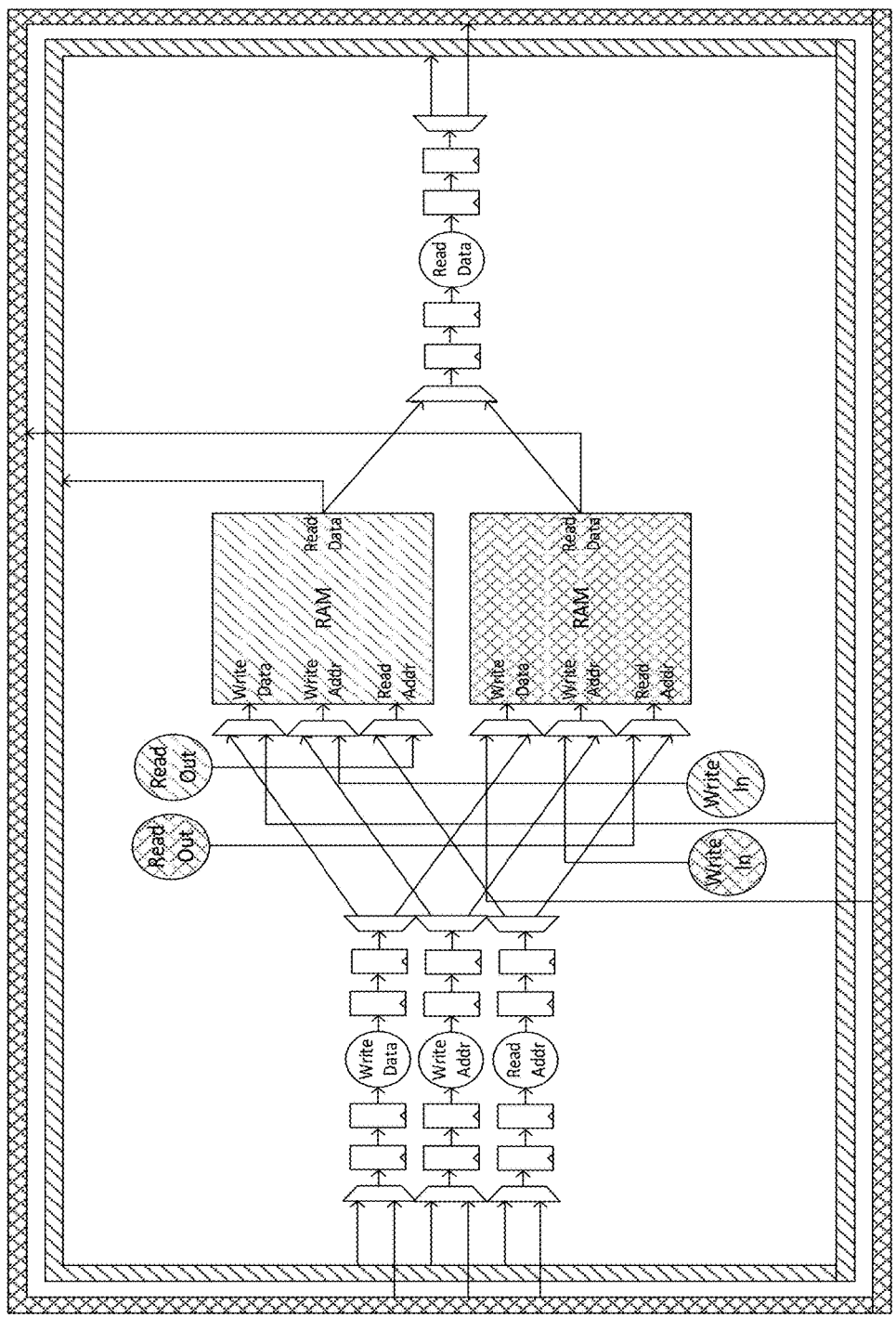

Referring back to FIG. 5E, a diagram is provided to illustrate an example of swapping in and swapping out of memory data. When memory data is swapped out, a thread is identified and an appropriate read address mechanism that has been added serializes the memory data appropriately. When memory data is swapped back in, an appropriate write address mechanism that has been added serializes the memory data appropriately. It should be appreciated that when memory data is swapped in and when memory data is swapped out, additional cycles may be required. Circuitry may be added to accommodate for the additional cycles needed by stalling the system while the serialization occurs.

Figure 10:
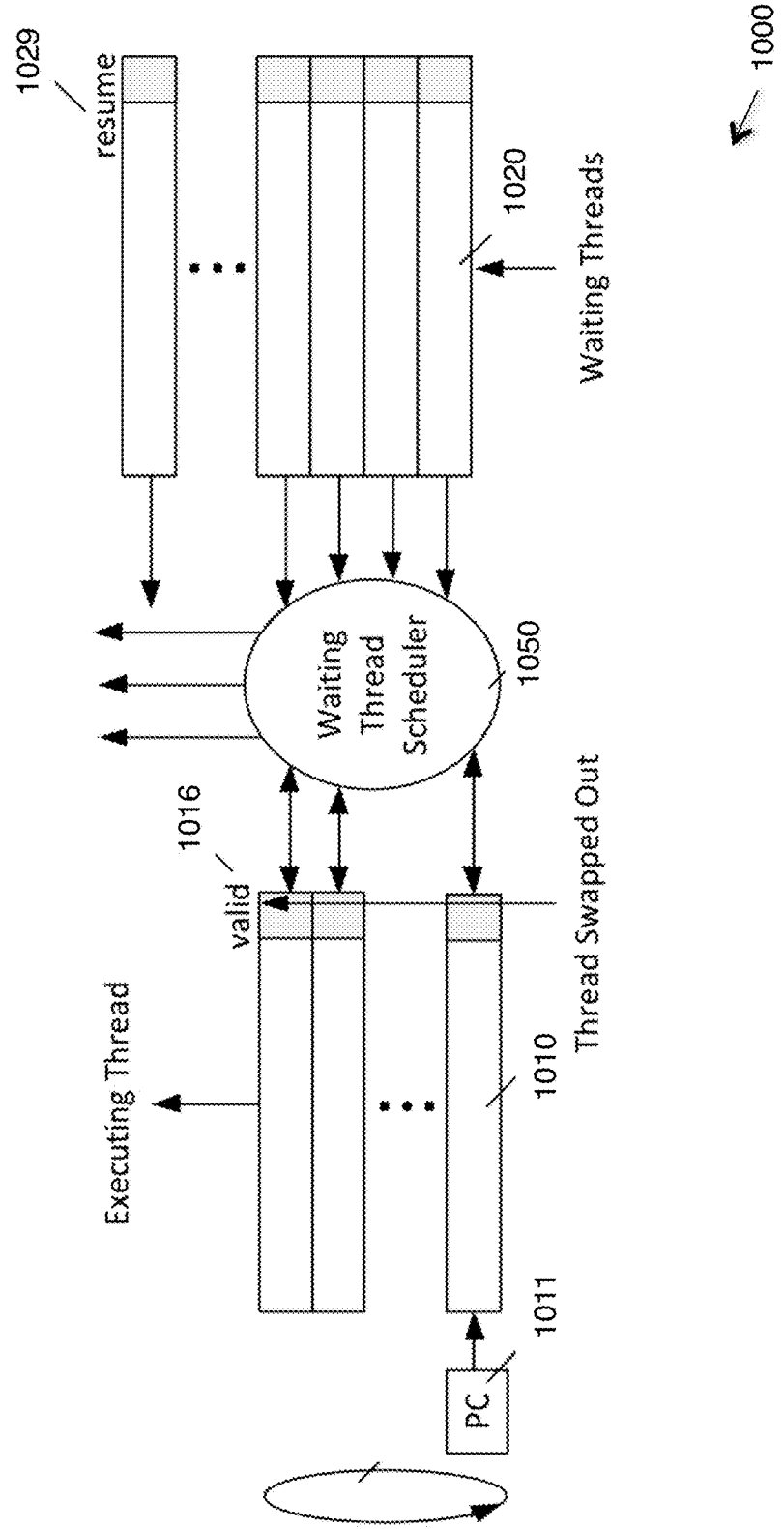
FIG. 10 illustrates a scheduler unit according to an embodiment of the present disclosure.
Figure 11A:
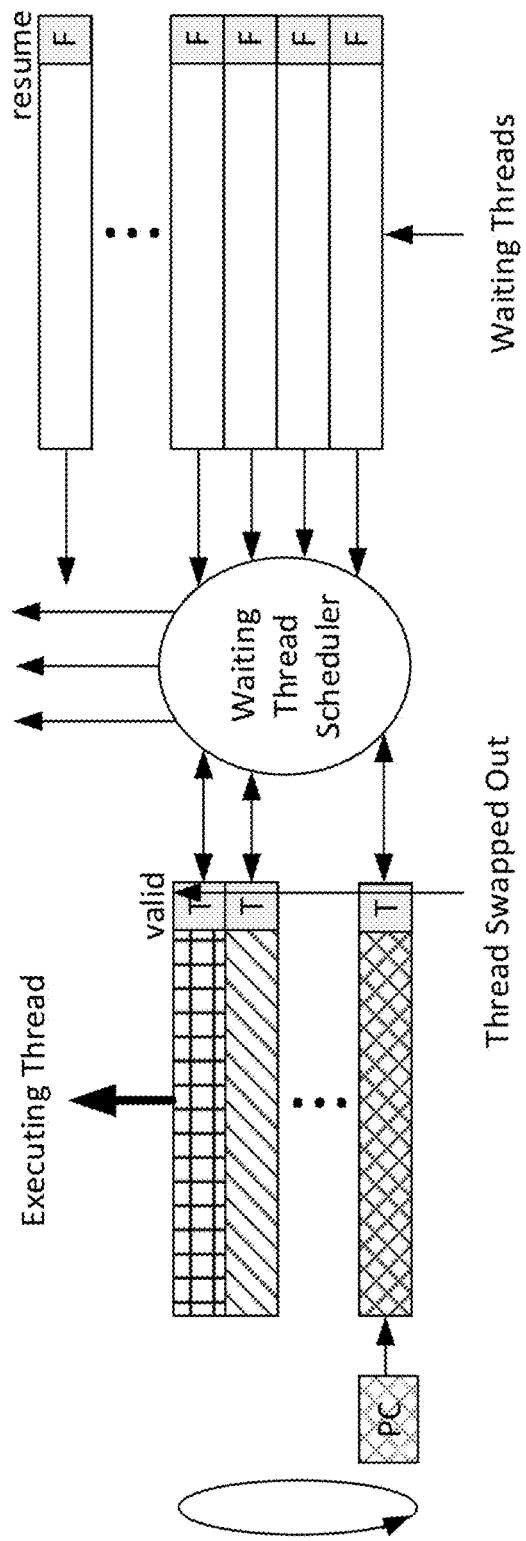
FIGS. 11A-11I illustrate examples of secure execution sequences of a scheduler unit according to an embodiment of the present disclosure.
Figure 11B:
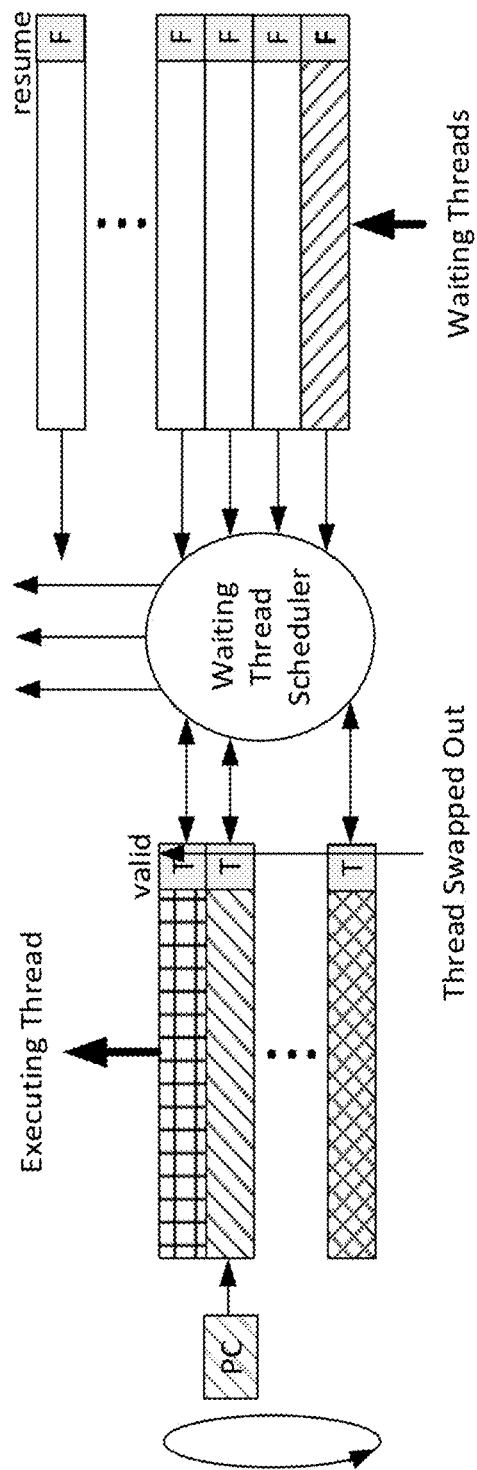
Figure 11C:
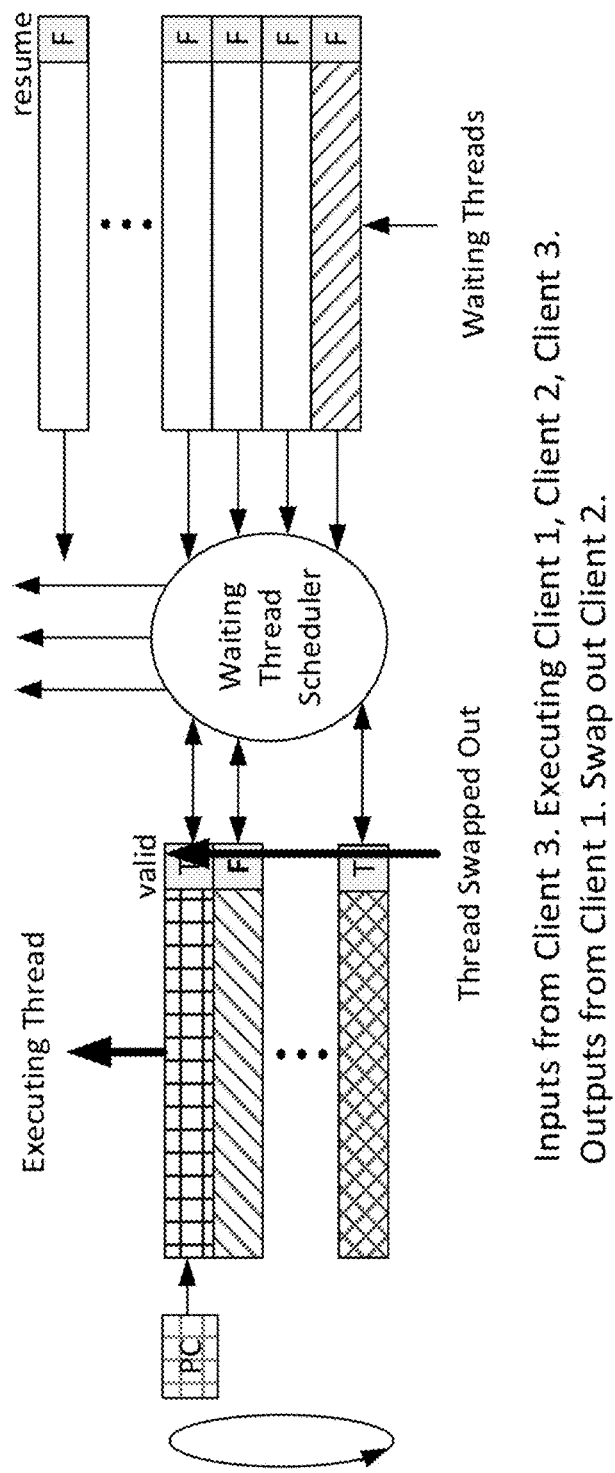
Figure 11D:
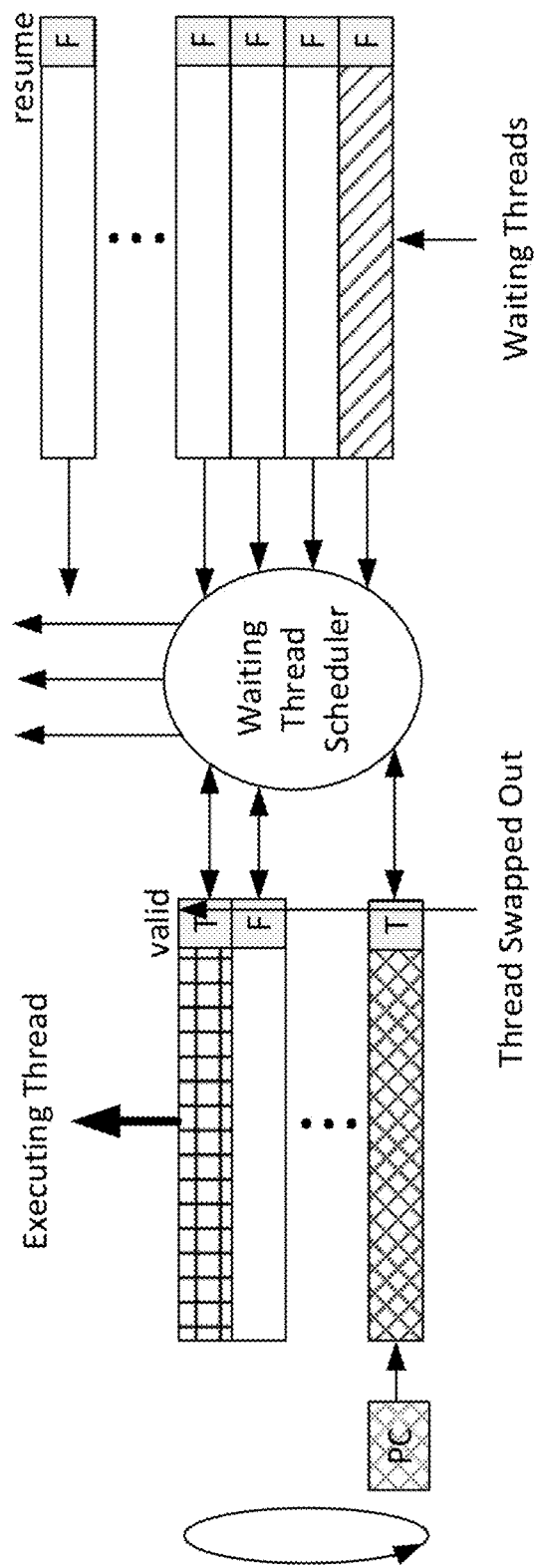
Figure 11E:
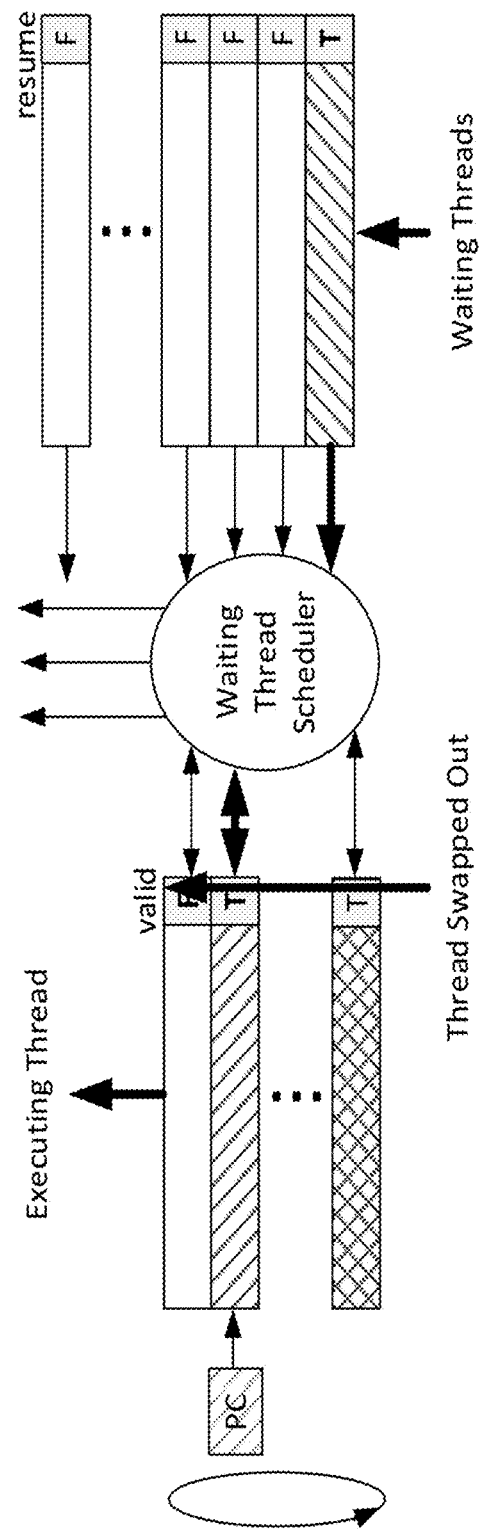
Figure 11F:
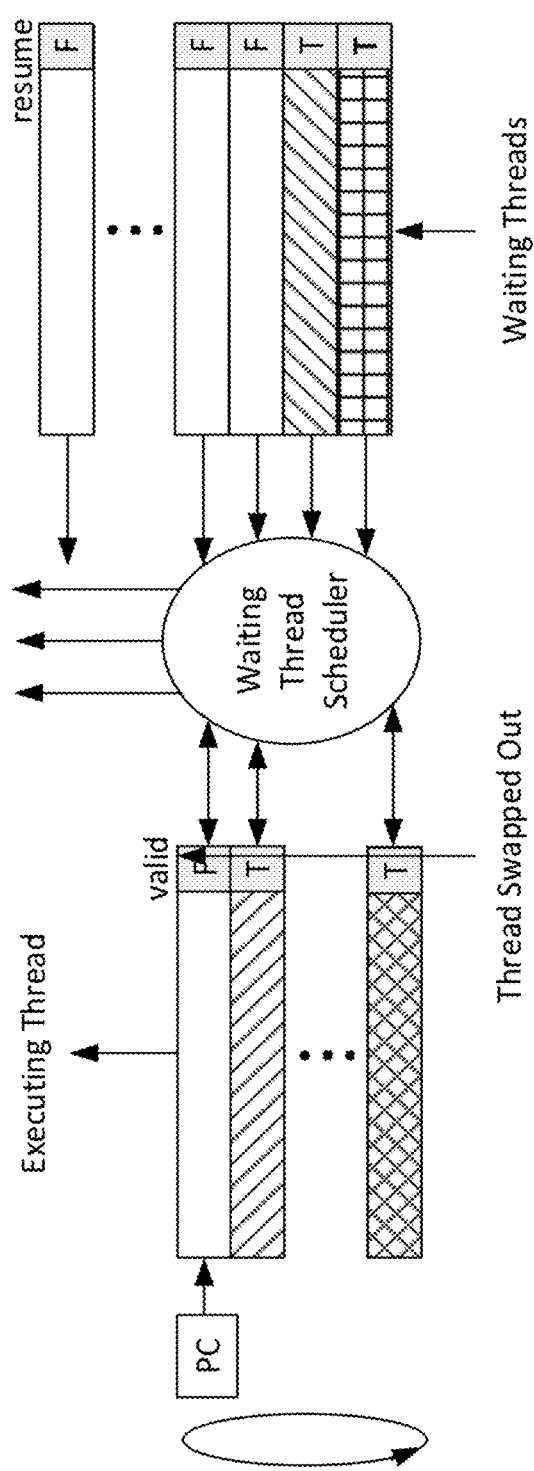
Figure 11G:
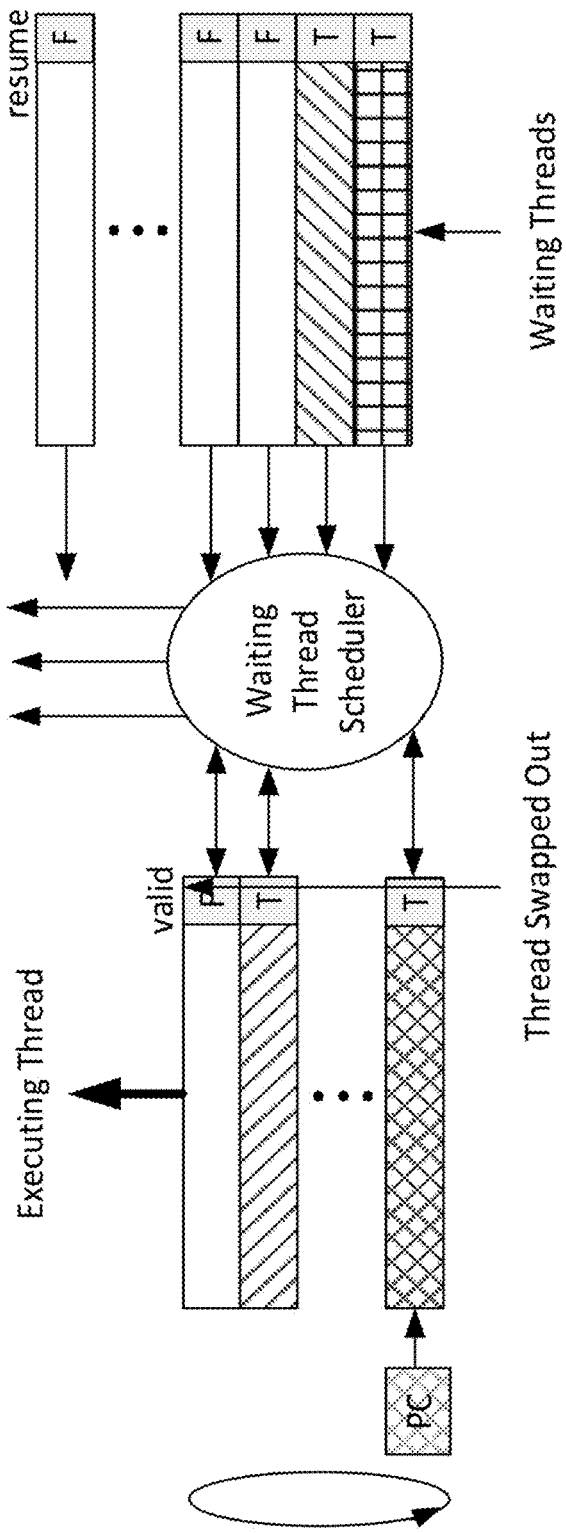
Figure 11H:
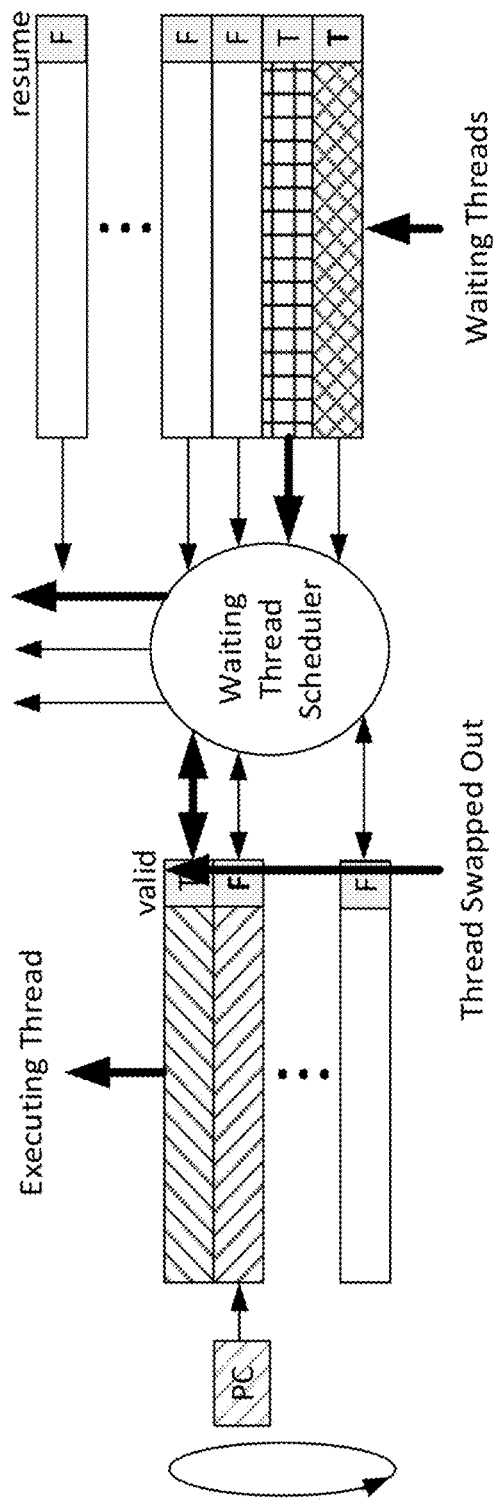
Figure 11I:
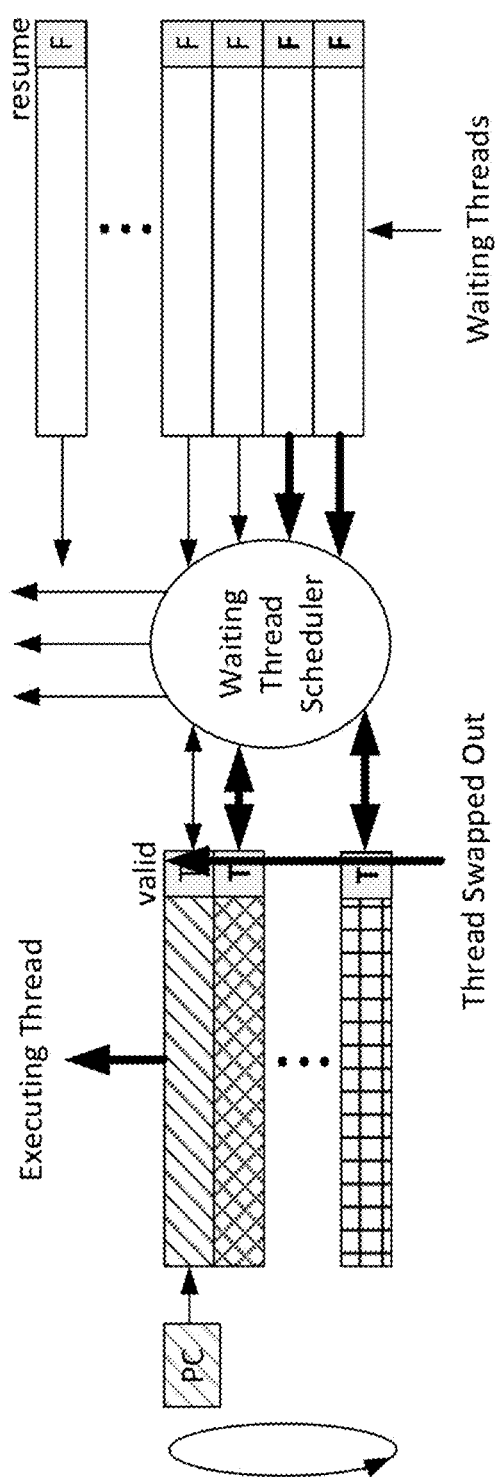

FIG. 10 illustrates a conceptual model of a scheduler unit 1000 according to an exemplary embodiment of the present disclosure. The scheduler unit 1000 may be used in part to implement thread scheduler 720 (shown in FIGS. 7 and 8A-8I). The scheduler unit 1000 includes an execution queue 1010. The execution queue 1010 includes a plurality of thread slots. Each thread slot may list a thread identifier that corresponds to a thread associated with a client. The order in which threads are listed in thread slots in an execution queue 1010 identifies an order of execution of the threads. A valid field 1016 corresponding to each thread slot may be used to indicate that a thread is actively executing by indicating that that the thread slot is valid. The valid field 1016 may also be used to indicate that a thread has been swapped out by indicating that the thread slot is not valid. When a thread slot is marked as not valid, it becomes available for swapping in a thread.

The scheduler unit 1000 includes a program counter 1011. The program counter 1001 loops around the thread slots in the execution queue 1010 and selects threads to execute. If a thread slot is empty a no operation is executed.

The scheduler unit 1000 includes a waiting queue 1020. The waiting queue 1020 includes a plurality of thread slots. Each thread slot may list a thread identifier that corresponds to a thread associated with a client. The order in which threads are listed in thread slots in a waiting queue 1020 identifies an order in which threads may be pulled from the waiting queue 1020 and placed in the execution queue 1010. A resume bit 1029 corresponding to each thread slot may be used to indicate whether a thread is new or whether the thread needs to swap in its previous state.

The scheduler unit 1000 includes a waiting thread scheduler 1050. The waiting thread scheduler 1050 monitors empty thread slots in the execution queue 1010 and waiting threads in thread slots in the waiting queue 1020 to determine when to pull threads from the waiting queue 1020 for placement onto the execution queue 1010. According to an embodiment of the present disclosure, the waiting thread scheduler 1050 may evaluate the threads in the execution queue 1010 and the waiting queue 1020 based on the threads' priority or other criteria to determine whether a thread should be removed from the execution queue 1010 and whether a thread from the waiting queue 1020 should take its place. The waiting thread scheduler 1050 provides control signaling to input, output, swap-in, and swap-out interfaces of a circuit to provide appropriate isolation for threads of clients.

FIG. 11A-11I illustrate examples of execution sequences of a scheduler unit according to an embodiment of the present disclosure. The examples of execution sequences of the scheduler unit in FIGS. 11A-11I correspond directly with the examples of execution sequences of the circuit machinery illustrated in FIGS. 8A-8I, and 9A-9B.

Figure 12:
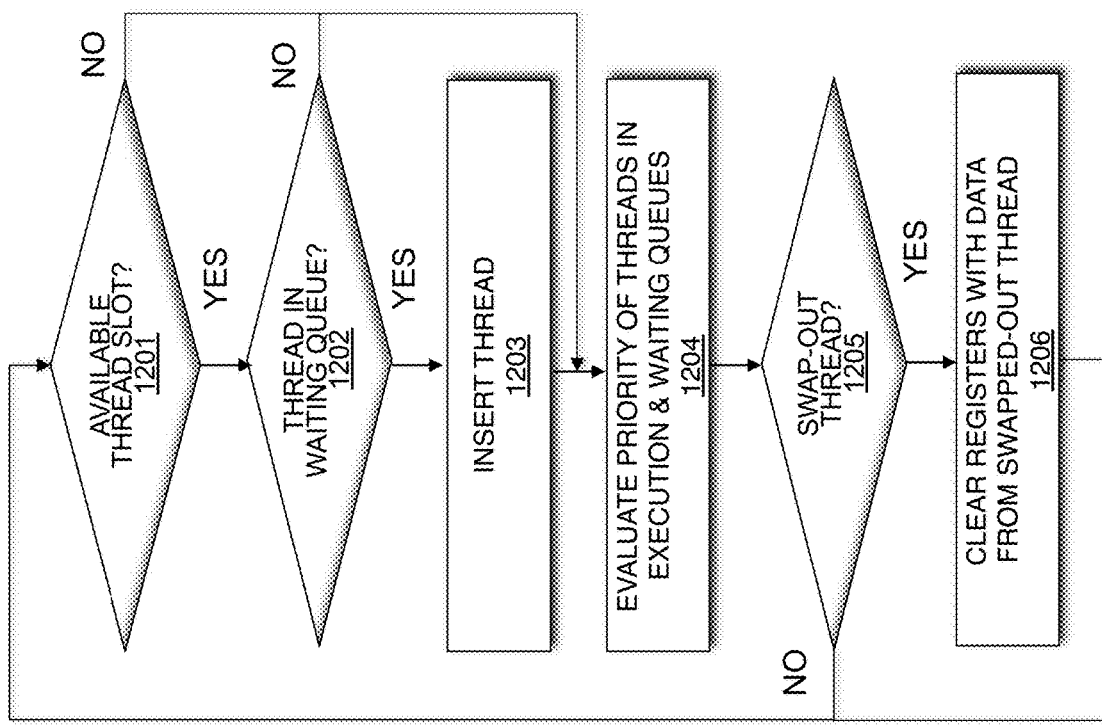
FIG. 12 is a flow chart illustrating a method for performing scheduling according to an embodiment of the present disclosure.

FIG. 12 is a flow chart illustrating a method for performing scheduling according to an exemplary embodiment of the present disclosure. The method illustrated in FIG. 12 may be performed by a scheduler unit. At 1201, it is determined whether a thread slot is available on an execution queue. If a thread slot is available on the execution queue, control proceeds to 1202. If a thread slot is not available on the execution queue, control proceeds to 1204.

At 1202, it is determined whether a thread is in the waiting queue. If a thread is in the waiting queue, control proceeds to 1203. If a thread is not in the waiting queue, control proceeds to 1204.

At 1203, the thread at the top of waiting queue is inserted into the execution queue. According to an embodiment of the present disclosure, if the thread may be a new thread or a thread that was previously swapped-out. If the thread is a new thread, data associated with the thread enters a circuit at the input of the circuit. If the thread is a previously swapped-out thread, data associated with the thread enters the circuit at a next state of the circuit where it exited.

At 1204, the priority of threads in the execution and waiting queues are evaluated. According to an embodiment of the present disclosure, priorities may be assigned based on a client paying a premium, a task requiring completion within an allotted time, or based on other constraints associated with task scheduling.

At 1205, it is determined whether a thread in the execution queue should be swapped out. The determination may be determined in response to the evaluation performed at 1204. If it is determined that a thread in the execution queue should be swapped out, control proceeds to 1206. If it is determined that a thread in the execution queue should not be swapped out, control returns to 1201.

At 1206, registers with data associated with threads that are swapped out are cleared. According to an embodiment of the present disclosure, clearing a register may involve writing zeros or other data in place of the data in the register. By clearing the register, data associated with the thread that is swapped out is prevented to be used by another thread. Control returns to 1201.

FIGS. 1, 2, 6, and 12 are flow charts that illustrate embodiments of the present disclosure. Some of the procedures described in these figures may be performed by an EDA tool implemented by a computer system. Other procedures may be performed by components generated by the EDA tool. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 13:
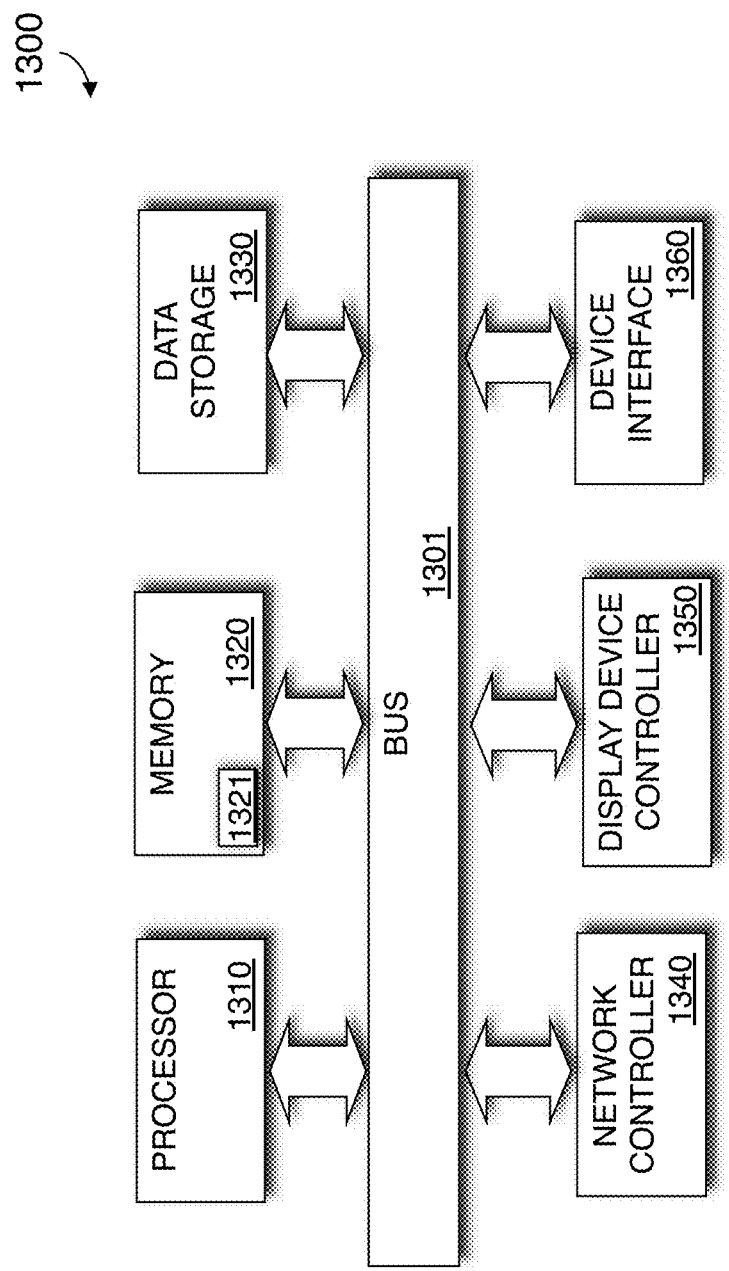
FIG. 13 illustrates a block diagram of a computer system implementing a system designer according to an embodiment of the present disclosure.

FIG. 13 is a block diagram of an exemplary computer system 1300 in which an example embodiment of the present disclosure resides. The computer system 1300 includes a processor 1310 that process data signals. The processor 1310 is coupled to a bus 1301 or other switch fabric that transmits data signals between processor 1310 and other components in the computer system 1300. The computer system 1300 includes a memory 1320. The memory 1320 may store instructions and code represented by data signals that may be executed by the processor 1310. A data storage device 1330 is also coupled to the bus 1301

A network controller 1340 is coupled to the bus 1301. The network controller 1340 may link the computer system 1300 to a network of computers (not shown) and supports communication among the machines. A display device controller 1350 is coupled to the bus 1301. The display device controller 1350 allows coupling of a display device (not shown) to the computer system 1300 and acts as an interface between the display device and the computer system 1300. A device interface 1360 is coupled to the bus 1301. The device interface 1360 allows coupling of an input device (not shown) to the computer system 1300 and transmits data signals from the input device to the computer system 1300.

A system designer 1321 may reside in the memory 1320 and be executed by the processor 1310. The system designer 1321 may operate to perform HDL compilation and program a target device as described with reference to FIGS. 1, 2, and 6. The system designer 1321 may operate to transform a design for a circuit into circuit machinery that is capable of time-division multiplexing aspects of the circuit implemented on configurable architectures in a virtualization environment. The transformation allows the circuit to support C contexts by duplicating state elements C times without having to change combinational circuitry. The transformation also creates interfaces that provide appropriate mechanisms to allow sharing of the combinational circuitry secure which provides an alternative to creating spatially distinct copies of the circuit to provide isolation.

Figure 14:
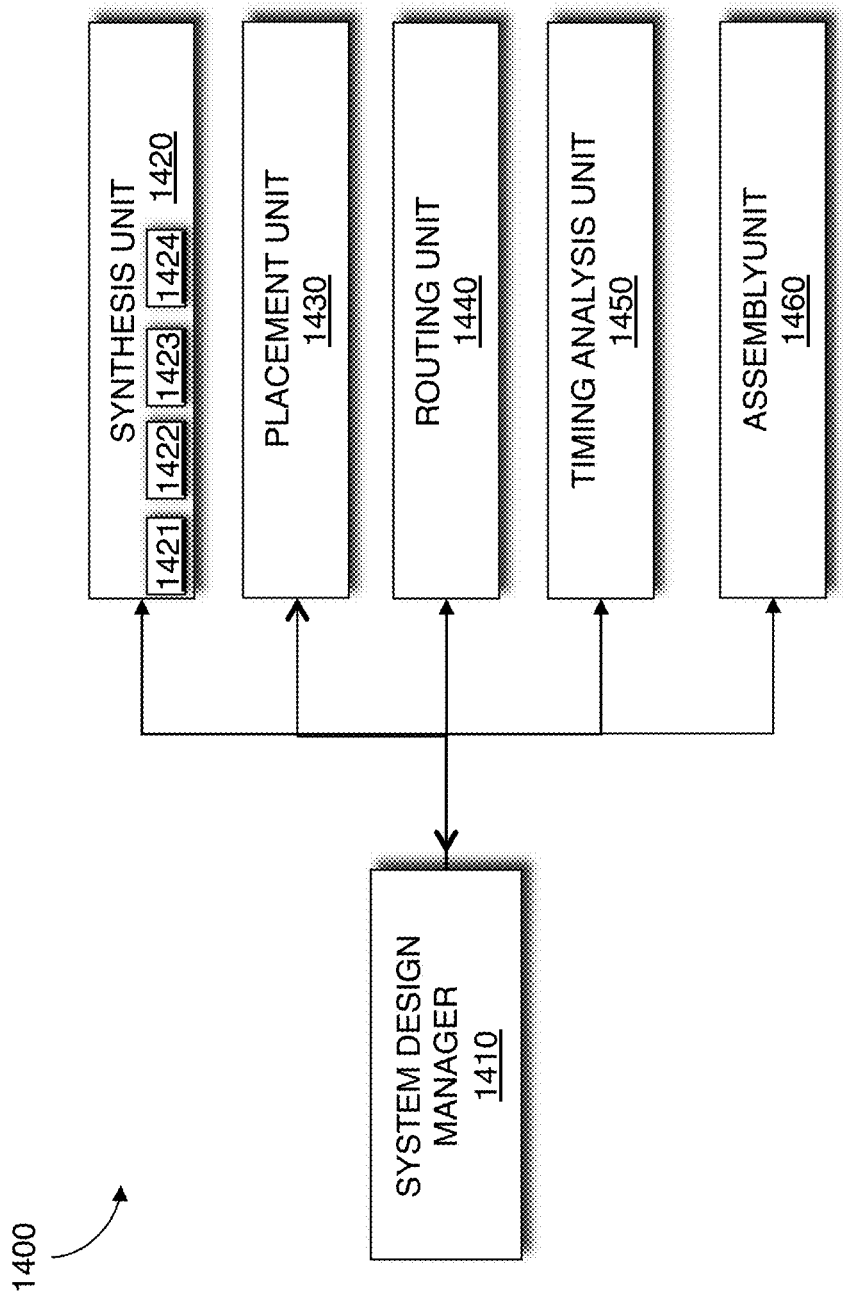
FIG. 14 is a block diagram of a system designer according to an embodiment of the present disclosure.

FIG. 14 illustrates a system designer 1400 according to an embodiment of the present disclosure. The system designer 1400 may be used to implement the system designer 1321 illustrated in FIG. 13. The system designer 1400 may be an EDA tool for designing a system on a target device such as an FPGA, application-specific integrated circuit (ASIC), structured ASIC, or other circuitry. FIG. 14 illustrates modules implementing an embodiment of the system designer 1400. According to one embodiment, the modules represent software modules and system design may be performed by a computer system such as the one illustrated in FIG. 13 executing sequences of instructions represented by the modules shown in FIG. 14. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software. The system designer 1400 includes a designer manager 1410. The designer manager 1410 is connected to and transmits data between the components of the system designer 1400.

The system designer 1400 includes a synthesis unit 1420 that performs synthesis. The synthesis unit 1420 generates a logic design of a system to be implemented on the target device. According to an embodiment of the system designer 1400, the synthesis unit 1420 takes a conceptual HDL design definition and generates an optimized logical representation of the system. The optimized logical representation of the system generated by the synthesis unit 1420 may include a representation that has a reduced number of functional blocks and registers, such as logic gates and logic elements, required for the system. Alternatively, the optimized logical representation of the system generated by the synthesis unit 1420 may include a representation that has a reduced depth of logic and that generates a lower signal propagation delay.

The synthesis unit 1420 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

According to an embodiment of the present disclosure, the synthesis unit 1420 includes a circuit identification unit 1421. The circuit identification unit 1421 identifies a circuit to be transformed to enable it to be multi-threaded. According to an embodiment of the present disclosure, the circuit may be identified in response to receiving input provided by a designer that identifies the circuit. According to an alternate embodiment of the present disclosure, the circuit may be identified by evaluating a high-level design of a system independent from any input provided by a designer to identify the circuit.

According to an embodiment of the present disclosure, the synthesis unit 1420 includes a thread identification unit 1422. The thread identification unit 1422 identifies a number of threads to be supported by the circuit at an instant of time is identified. According to an embodiment of the present disclosure, the number of threads to be supported by the circuit may be identified in response to receiving input provided by a designer. According to an alternate embodiment of the present disclosure, the number of threads to be supported by the circuit may be identified by evaluating a high-level design of the system independent from utilizing any input provided by a designer to identify the number of threads.

According to an embodiment of the present disclosure, the synthesis unit 1420 includes a circuit transformation unit 1423. The circuit transformation unit 1423 transforms a circuit to enable it to support the number of threads. According to an embodiment of the present disclosure where a number of threads to be supported is C, the circuit is modified by adding C-1 registers before all registers that are involved in a feedback path or in a reconvergent fanout. After adding the C-1 registers to the circuit, the circuit may further be register retimed to reduce latency.

According to an embodiment of the present disclosure, the synthesis unit 1420 includes an interface generation unit 1424. The interface generation unit 1424 generates an interface to manage data that is transmitted to and from the circuit from one or more clients executing one or more threads accessing the circuit. According to an embodiment of the present disclosure, the interface includes circuitry that enables one or more threads to be swapped out of an execution queue for accessing the circuit and that enables one or more threads to be swapped into the execution queue for accessing the circuit. In this embodiment, data associated with the one or more threads to be swapped out of the execution queue are swapped out of the circuit, and data associated with the one or more threads that are swapped into the execution queue are swapped into the circuit. A thread scheduler that operates as the controller for the execution of threads and that manages the interfaces may also be generated by the interface generation unit 1424.

The system designer 1400 includes a placement unit 1430 that processes the optimized technology-mapped netlist to produce a placement for each of the functional blocks. The placement identifies which components or areas on the target device are to be used for specific functional blocks and registers.

The system designer 1400 includes a routing unit 1440 that performs routing. The routing unit 1445 determines the routing resources on the target device to use to provide interconnection between the components implementing functional blocks and registers of the logic design.

The system designer 1400 includes a timing analysis unit 1450 that performs timing analysis to determine whether timing constraints of the system are satisfied. The timing analysis unit 1450 may generate report files which identify the area required for implementing the system on the target device, the largest slack value for a path in a section of the system, and other statistics.

The system designer 1400 includes an assembly unit 1460 that performs an assembly procedure that creates a data file that includes the design of the system generated by the system designer 1400. The data file may be a bit stream that may be used to program the target device. The assembly unit 1460 may output the data file so that the data file may be stored or alternatively transmitted to a separate machine used to program the target device. It should be appreciated that the assembly unit 1460 may also output the design of the system in other forms such as on a display device or other medium.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 15:
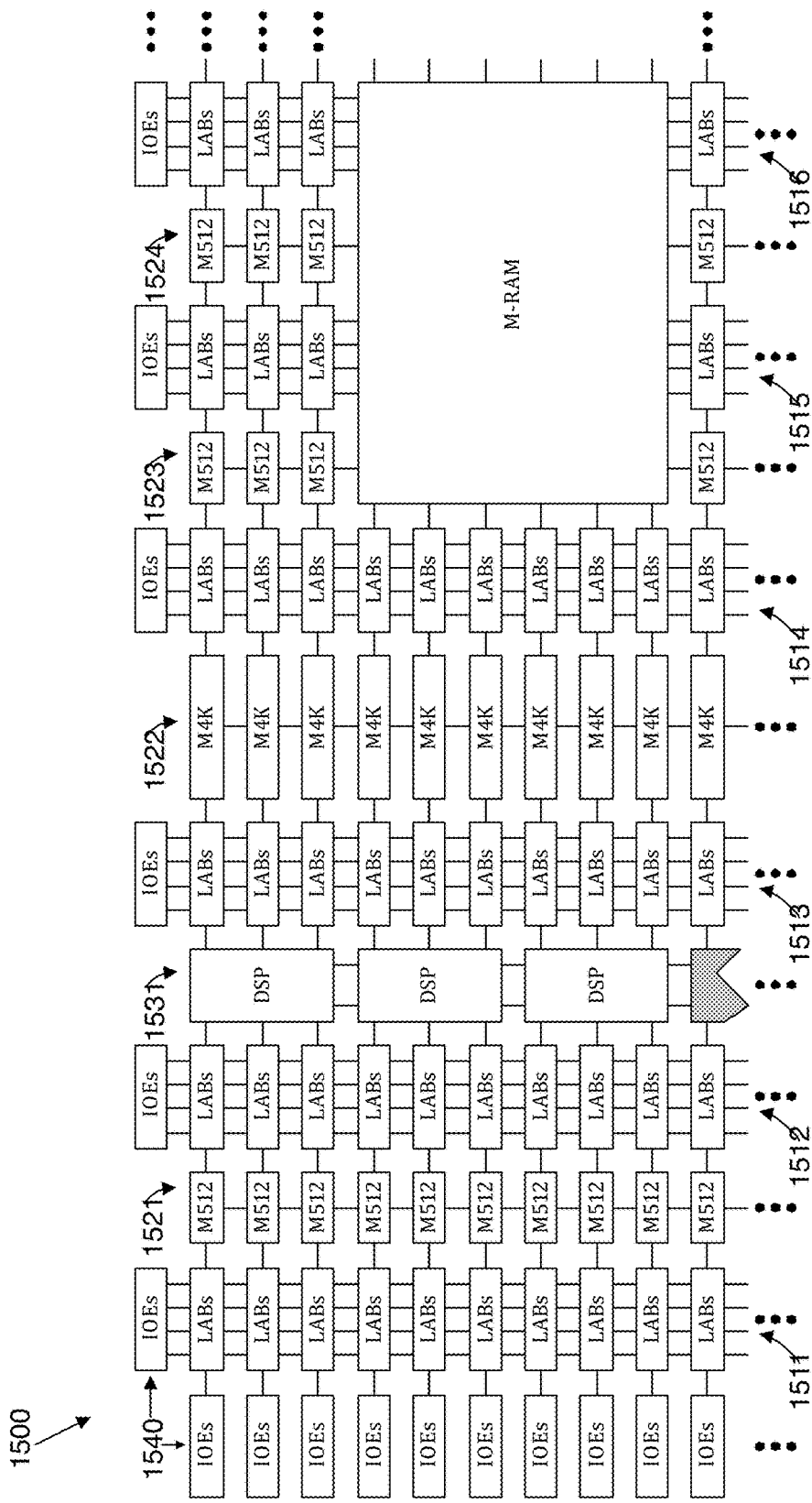
FIG. 15 illustrates an exemplary target device according to an embodiment of the present disclosure.

FIG. 15 illustrates a device 1500 that may be used to implement a target device according to an embodiment of the present disclosure. The device 1500 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix, Cyclone, or Arria devices manufactured by Altera® Corporation owned by Intel Corporation, or a combinational logic block (CLB) such as those found in Virtex devices manufactured by Xilinx Inc. In this embodiment, the logic block may include a four input LUT with a configurable register. According to an alternate embodiment of the present disclosure, the logic block may operate similarly to an adaptive logic module (ALM), such as those found in Stratix devices manufactured by Altera Corporation. LABs are grouped into rows and columns across the device 1500. Columns of LABs are shown as 1511-1516. It should be appreciated that the logic block may include additional or alternate components.

The device 1500 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1500. Columns of memory blocks are shown as 1521-1524.

The device 1500 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1500 and are shown as 1531.

The device 1500 includes a plurality of input/output elements (IOEs) 1540. Each IOE feeds an IO pin (not shown) on the device 1500. The IOEs 1540 are located at the end of LAB rows and columns around the periphery of the device 1500. Each IOE may include a bidirectional IO buffer and a plurality of registers for registering input, output, and output-enable signals.

The device 1500 may include routing resources such as LAB local interconnect lines, row interconnect lines ("H-type wires"), and column interconnect lines ("V-type wires") (not shown) to route signals between components on the target device.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for designing a system on a target device, comprising:
    modifying a circuit to enable the circuit to support a plurality of threads at a same time; and
    generating an interface that enables one or more of the plurality of threads to be swapped out of an execution queue for accessing the circuit and that enables one or more other threads to be swapped into the execution queue for accessing the circuit, wherein the interface prevents data associated with a thread that is swapped out to be utilized by another thread, wherein at least one of the modifying and the generating is performed by a processor;
    generating a data file that describes the system that includes the modified circuit and the interface; and
    programming the target device with the data file to physically transform components on the target device to implement the system.

2. The method of claim 1, wherein modifying the circuit comprises adding C-1 registers before each register in a feedback path or a reconvergent fanout in the circuit, wherein C is the number of threads to be supported by the circuit.

3. The method of claim 1, wherein generating the interface comprises:
    generating input multiplexers having C inputs, wherein C is a number of threads to be supported by the circuit;
    generating output demultiplexers having C outputs; and
    generating a scheduler that selects the input multiplexers and output demultiplexers.

4. The method of claim 3, wherein generating the interface further comprises generating demultiplexers for capturing output of each state in the circuit.

5. The method of claim 3, wherein generating the interface further comprises generating multiplexers for enabling data for a thread to be swapped into one or more states in the circuit.

6. The method of claim 3, wherein the scheduler clears data in one or more registers associated with a thread that is swapped out.

7. The method of claim 1, wherein the one or more threads that are swapped out of the execution queue and the one or more other threads are swapped into the execution queue in response to an evaluation of a priority of the threads.

8. The method of claim 1, wherein the modifying and generating are performed during synthesis prior to placement and routing during hardware description language compilation.

9. The method of claim 1, wherein the circuit and interface are implemented on the target device.

10. The method of claim 1, wherein modifying the circuit comprises adding C-1 memory systems, wherein C is a number of threads to be supported by the circuit and data is serialized in and out of the C-1 memory systems.

11. The method of claim 10, wherein modifying the circuit comprises adding a component to stall the system to allow the data to be serialized in and out of the C-1 memory systems.

12. The method of claim 1 further comprising:
    identifying the circuit to be modified to support the plurality of threads at a same time; and
    identifying the plurality threads.

13. The method of claim 12, wherein identifying the circuit comprises receiving input provided by a designer identifying the circuit.

14. The method of claim 12, wherein identifying the circuit comprises evaluating a high-level design of the system.

15. The method of claim 12, wherein identifying the number of threads comprises receiving input provided by a designer identifying the number.

16. The method of claim 12, wherein identifying the number of threads comprises evaluating a high-level design of the system.

17. A system designer, comprising
    a synthesis unit that includes a circuit transformation unit that modifies a circuit to enable the circuit to support a plurality of threads at a same time, and an interface generation unit that generates an interface that enables one or more of the plurality of threads to be swapped out of an execution queue for accessing the circuit and that enables one or more other threads to be swapped into the execution queue for accessing the circuit, wherein the interface prevents data associated with a thread that is swapped out to be utilized by another thread; and
    an assembly unit that generates a data file that describes a system that includes the modified circuit and the interface, and that programs the target device with the data file to physically transform components on the target device to implement the system, wherein at least one of the synthesis unit and assembly unit is implemented with a processor.

18. The system designer of claim 17, wherein the circuit transformation unit modifies the circuit by adding C-1 registers before each register in a feedback path or a reconvergent fanout in the circuit, wherein C is a number of threads to be supported by the circuit.

* * * * *